United States Patent
Sugaya

(10) Patent No.: US 8,457,223 B2
(45) Date of Patent: Jun. 4, 2013

(54) WIRELESS COMMUNICATION DEVICE, WIRELESS COMMUNICATION METHOD, PROGRAM AND WIRELESS COMMUNICATION SYSTEM

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 545 days.

(21) Appl. No.: 12/418,812

(22) Filed: Apr. 6, 2009

(65) Prior Publication Data

US 2009/0252244 A1  Oct. 8, 2009

(30) Foreign Application Priority Data

Apr. 7, 2008 (JP) ................................ P2008-099252

(51) Int. Cl.
  *H04K 1/10* (2006.01)
(52) U.S. Cl.
  USPC ......................................... 375/260; 375/328
(58) Field of Classification Search
  USPC ......................................... 375/260; 370/328
  See application file for complete search history.

(56) References Cited

U.S. PATENT DOCUMENTS

| 2004/0013096 | A1* | 1/2004 | Marinier et al. ............... 370/328 |
| 2006/0050800 | A1* | 3/2006 | Aytur et al. .................... 375/260 |
| 2006/0239220 | A1* | 10/2006 | Celentano et al. ............ 370/328 |
| 2008/0101504 | A1* | 5/2008 | Huang et al. .................. 375/340 |
| 2010/0322334 | A1* | 12/2010 | Wang et al. .................... 375/267 |

FOREIGN PATENT DOCUMENTS

| JP | 07-288858 | 10/1995 |
| JP | 2004-289373 | 10/2004 |
| JP | 2006-042076 | 2/2006 |
| JP | 2007-053546 | 3/2007 |
| JP | 2007-158485 | 6/2007 |
| JP | 2007-311909 | 11/2007 |

\* cited by examiner

*Primary Examiner* — Shuwang Liu
*Assistant Examiner* — Michael Neff
(74) *Attorney, Agent, or Firm* — Finnegan, Henderson, Farabow, Garrett & Dunner, L.L.P.

(57) ABSTRACT

A wireless communication device is provided that includes: a plurality of receiving portions that respectively receive wireless signals that are transmitted based on frequency-use methods set from among a plurality of frequency-use methods; and a setting portion that sets one of the plurality of frequency-use methods on each of the plurality of receiving portions respectively. The setting portion changes the frequency-use method of the plurality of receiving portions, based on a receiving result of a wireless signal in each of the plurality of receiving portions.

16 Claims, 27 Drawing Sheets

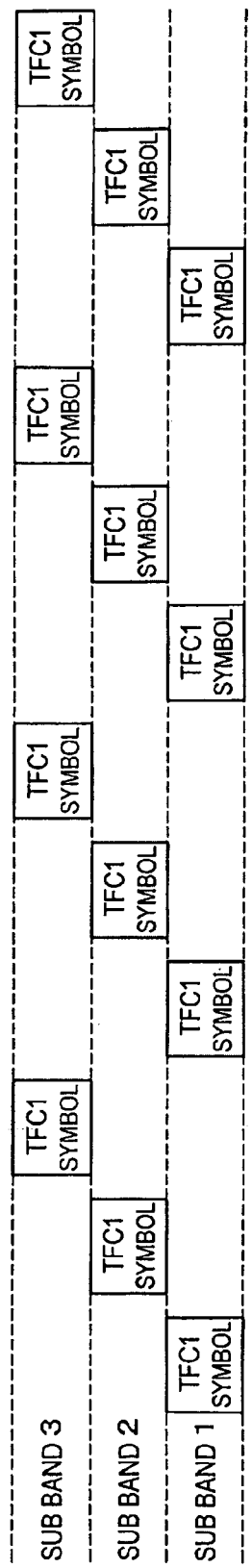

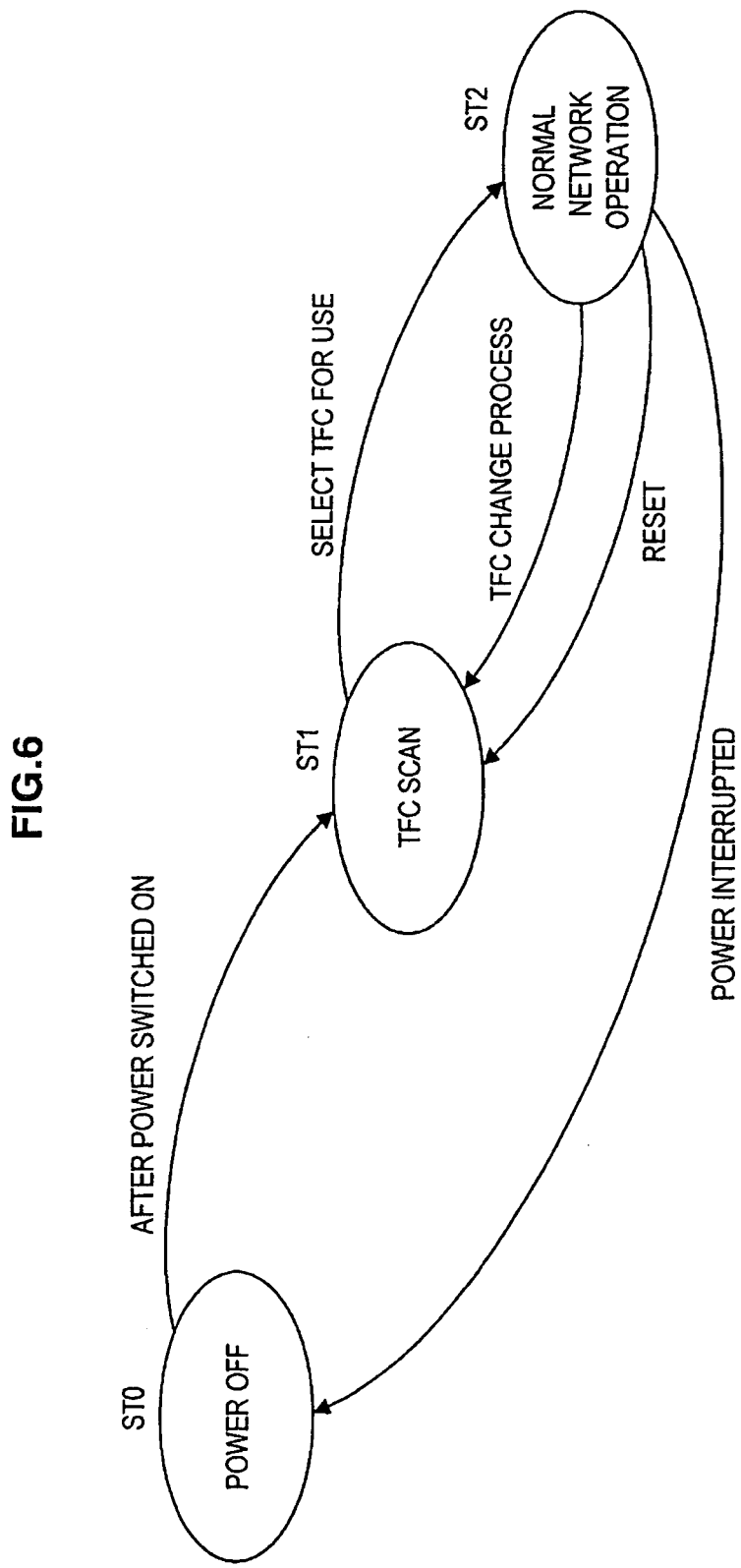

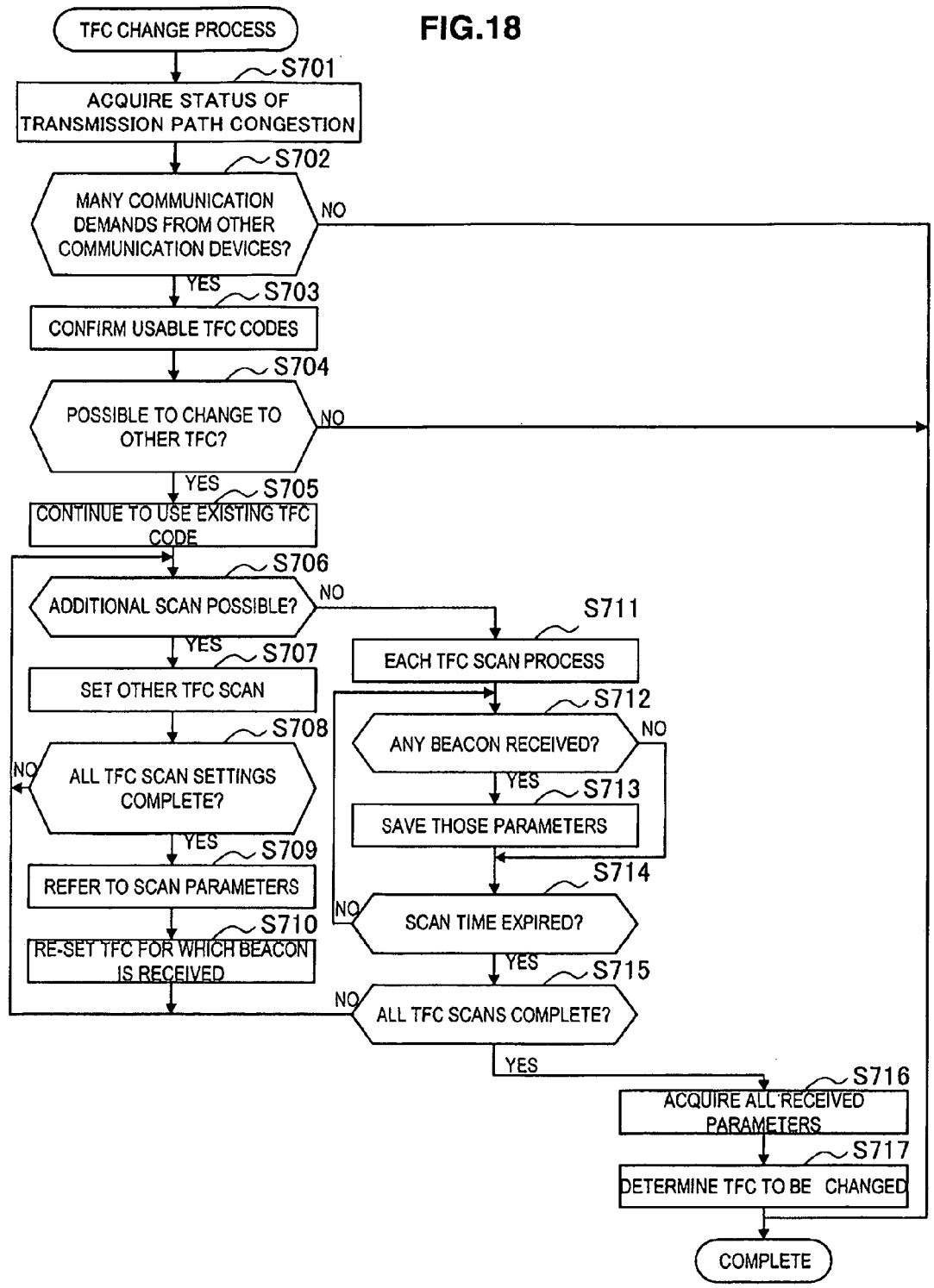

WIRELESS COMMUNICATION DEVICE, WIRELESS COMMUNICATION METHOD, PROGRAM AND WIRELESS COMMUNICATION SYSTEM

BACKGROUND OF THE INVENTION

1. Field of the Invention

The present invention relates to a wireless communication device, a wireless communication method, a program and a wireless communication system.

2. Description of the Related Art

In wireless communication systems based on the multi-band orthogonal frequency division multiplexing (OFDM) system, specific frequencies are used to perform wireless communication. For example, one example of a system using frequencies is the use of a frequency hopping pattern in which the frequency used is changed as time elapses.

Also, there are cases in which wireless communication devices that form a wireless communication system perform scanning in order to identify a frequency hopping pattern that is being used in the vicinity. For example, in the WiMedia Distributed MAC Layer Specification, in order to identify other wireless communication devices in the vicinity at the time of initial operation, it has been suggested that it is preferable for a wireless communication device to perform scanning using all frequency hopping patterns.

A frequency-use method scanning operation by a wireless communication device, such as a frequency hopping pattern scan etc., is disclosed, for example in Japanese Patent Application Publication No. JP-A-2007-158485. More specifically, for example, in Japanese Patent Application Publication No. JP-A-2007-158485, a wireless communication device is disclosed that performs a scan of other frequency-use methods while not operating on a normally used frequency-use method.

SUMMARY OF THE INVENTION

However, when performing a scanning operation by changing the frequency hopping pattern one at a time, as the number of frequency hopping patterns increases, the time required for the scan increases greatly.

The present invention addresses the problem described above and provides a new and improved wireless communication device, a wireless communication system, a wireless communication method, a program and a wireless communication system that are capable of efficiently detecting frequency-use methods being used in the vicinity.

According to an embodiment of the present invention, there is provided a wireless communication device that includes: a plurality of receiving portions that respectively receive wireless signals that are transmitted based on frequency-use methods set from among a plurality of frequency-use methods; and a setting portion that sets one of the plurality of frequency-use methods on each of the plurality of receiving portions respectively. More specifically, the setting portion changes the frequency-use method of the plurality of receiving portions, based on a receiving result of a wireless signal in each of the plurality of receiving portions.

With this configuration, the setting portion sets the frequency-use methods on the plurality of receiving portions based on the result indicating whether a wireless signal has been received by the plurality of receiving portions. Each of the plurality of receiving portions receives a wireless signal transmitted based on the frequency-use method set by the setting portion.

The setting portion may continuously set the same frequency-use method in the receiving portions that have received a wireless signal, and may set a frequency-use method that differs from the frequency-use method previously set in the receiving portions that have not received a wireless signal.

When the number of the receiving portions that have received a wireless signal exceeds a predetermined number, the setting portion may change the frequency-use method on one of the receiving portions that has received a wireless signal.

After sequentially setting the plurality of frequency-use methods in each of the plurality of receiving portions respectively, the setting portion may reset on one of the plurality of receiving portions the frequency-use method that corresponds to a wireless signal received by the receiving portion when the plurality of frequency-use methods were sequentially set.

After sequentially setting the plurality of frequency-use methods in each of the plurality of receiving portions respectively, the setting portion may sequentially reset on the plurality of receiving portions frequency-use methods that correspond to wireless signals that were not received by the plurality of receiving portions when the plurality of frequency-use methods were sequentially set.

The wireless communication device may further include a transmission portion that transmits a wireless signal using one of the plurality of frequency-use methods. With this configuration, the setting portion may set the frequency-use method used by the transmission portion on one of the receiving portions from among the plurality of receiving portions, and may sequentially set frequency-use methods differing from the frequency-use method used by the transmission portion on the other receiving portions.

According to another embodiment of the present invention, there is provided a wireless communication method that includes the steps of: setting one of a plurality of frequency-use methods on each of a plurality of receiving portions; and changing the frequency-use method of the plurality of receiving portions based on a receiving result of a wireless signal in each of the plurality of receiving portions.

According to another embodiment of the present invention, there is provided a program that includes instructions commanding a computer to function as: a plurality of receiving portions that respectively receive wireless signals transmitted based on frequency-use methods that are set from among a plurality of frequency-use methods, and a setting portion that sets one of the plurality of frequency-use methods on, each of the plurality of receiving portions respectively, and, based on a receiving result of a wireless signal in each of the plurality of receiving portions, changes the frequency-use method of the plurality of receiving portions.

According to another embodiment of the present invention, there is provided a wireless communication system that includes a plurality of wireless communication devices, each of the wireless communication devices including: a plurality of receiving portions that respectively receive wireless signals transmitted based on frequency-use methods that are set from among a plurality of frequency-use methods; and a setting portion that sets one of the plurality of frequency-use methods on each of the plurality of receiving portions respectively, and, based on a receiving result of a wireless signal in each of the plurality of receiving portions, sets the plurality of receiving portions.

According to the embodiments of the present invention described above, frequency-use methods being used in the vicinity can be efficiently detected.

BRIEF DESCRIPTION OF THE DRAWINGS

FIG. 5A is an explanatory diagram showing a frequency hopping pattern of a time frequency code (TFC) 1;

FIG. 6 is an explanatory diagram showing changes in the status of a wireless communication device related to the present embodiment;

FIG. 11 is an explanatory diagram showing a first example of TFC code setting performed by a TFC setting portion in order to perform scanning when the power source is switched on;

FIG. 12 is an explanatory diagram showing a second example of TFC code setting performed by the TFC setting portion in order to perform scanning when the power source is switched on;

FIG. 13 is an explanatory diagram showing a third example of TFC code setting performed by the TFC setting portion in order to perform scanning when the power source is switched on;

FIG. 14 is an explanatory diagram showing a fourth example of TFC code setting performed by the TFC setting portion in order to perform scanning when the power source is switched on;

FIG. 15 is a flow chart showing the flow of operations of the wireless communication device when the power source is switched on;

FIG. 18 is a flow chart showing the flow of changing the TFC code by the wireless communication device.

DETAILED DESCRIPTION OF THE PREFERRED EMBODIMENTS

Figure 1:
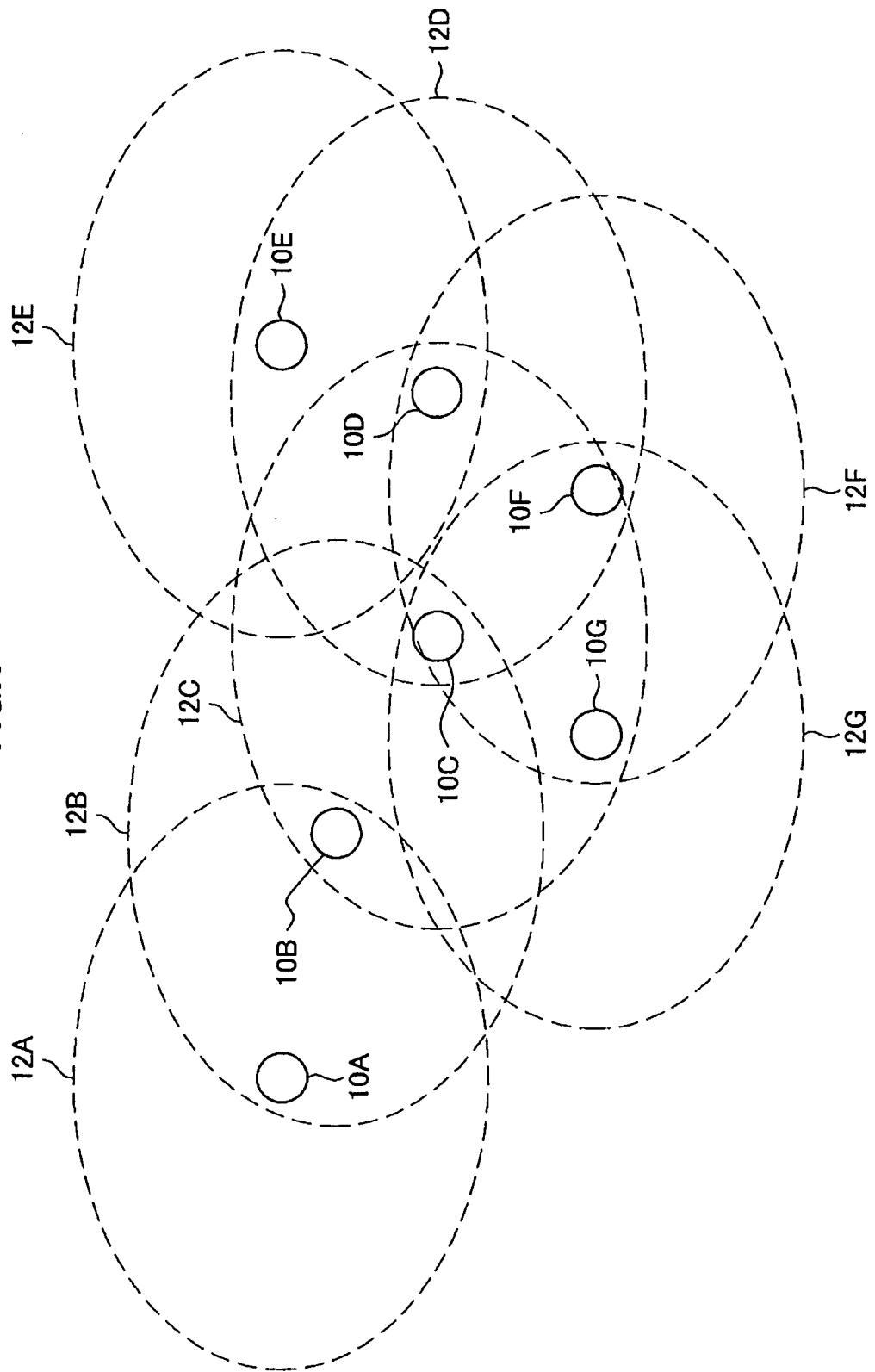
FIG. 1 is an explanatory diagram showing an example of the configuration of a wireless communication system according to a present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiment for practicing the present invention will be explained in the order shown below.

1. Overview of wireless communication system according to present embodiment
1-1. Example of configuration of wireless communication system
1-2. Time sharing control
1-3. TFC code
2. Background of present embodiment
3. Detailed description of present embodiment
3-1. Configuration of wireless communication device according to present embodiment
3-2. Operations of wireless communication device according to present embodiment
4. Conclusion

1. OVERVIEW OF WIRELESS COMMUNICATION SYSTEM ACCORDING TO PRESENT EMBODIMENT 1-1. Example of Configuration of Wireless Communication System First, an example of the configuration of a wireless communication system 1 according to a present embodiment will be explained with reference to FIG. 1.

FIG. 1 is an explanatory diagram showing an example of the configuration of the wireless communication system 1 according to the present embodiment. Circles in FIG. 1 show wireless communication devices 10A to 10G. Areas denoted by dotted lines show radio wave reachable ranges 12A to 12G in which the respective wireless communication devices 10A to 10G can perform communication.

More specifically, the wireless communication device 10A can communicate with the wireless communication device 10B that is included in the radio wave reachable range 12A of the wireless communication device 10A. The wireless communication device 10B can communicate with the wireless communication devices 10A and 10C that are included in the radio wave reachable range 12B of the wireless communication device 10B. Similarly, the wireless communication device 10C can communicate with the wireless communication devices 10B, 10D, 10F and 10G. The wireless communication device 10D can communicate with the wireless communication devices 10C, 10E and 10F. The wireless communication device 10E can communicate with the wireless communication device 10D.

Further, the wireless communication device 10F can communicate with the wireless communication devices 10C, 10D and 10G that are included in the radio wave reachable range 12F of the wireless communication device 10F. Similarly, the wireless communication device 10G can communicate with the wireless communication devices 10C and 10F.

The above-described wireless communication devices 10A to 10G transmit and receive beacons, which are an example of communication management information, at a predetermined cycle, and form an autonomous distributed wireless network (an ad hoc network). Thus, the wireless communication devices 10A to 10G that form the wireless network can transmit and receive various types of data. The various types of data may include audio data such as music, a lecture, a radio program, or the like, visual data such as a motion picture, a television program, a video program, a photograph, a document, a painting, a diagram, or the like, and any other type of data, such as a game, software, or the like.

Note that, in the description hereinafter, when it is not necessary to specifically distinguish between the wireless communication devices 10A to 10G, the term wireless communication devices 10 alone will be used. Further, when it is not necessary to specifically distinguish between the radio wave reachable ranges 12A to 12G, the generic term radio wave reachable ranges 12 will be used. Further, FIG. 1 shows the wireless communication system 1 and also shows the wireless network. Therefore, it can be understood that the terms wireless communication system 1 and wireless network can be almost synonymously used. However, generally, the term network indicates a structure including links in addition to nodes (wireless communication devices). Accordingly, it can also be understood that the wireless network is different from the wireless communication system 1 in that the wireless network includes links in addition to the wireless communication devices 10A to 10G.

Moreover, each of the wireless communication devices 10 may be any information processing device such as a personal computer (PC), a household image processing device (a DVD recorder, a video deck or the like), a mobile phone, a personal handyphone system (PHS), a mobile music playback device, a mobile image processing device, a personal digital assistant (PDA), a household game console, a mobile game machine, an electrical household appliance, or the like.

1-2. Time Sharing Control

One example of the configuration of the autonomous distributed wireless communication system 1 is described above. Next, a super frame for time sharing control in the wireless communication system 1 will be described with reference to FIG. 2.

Figure 2:
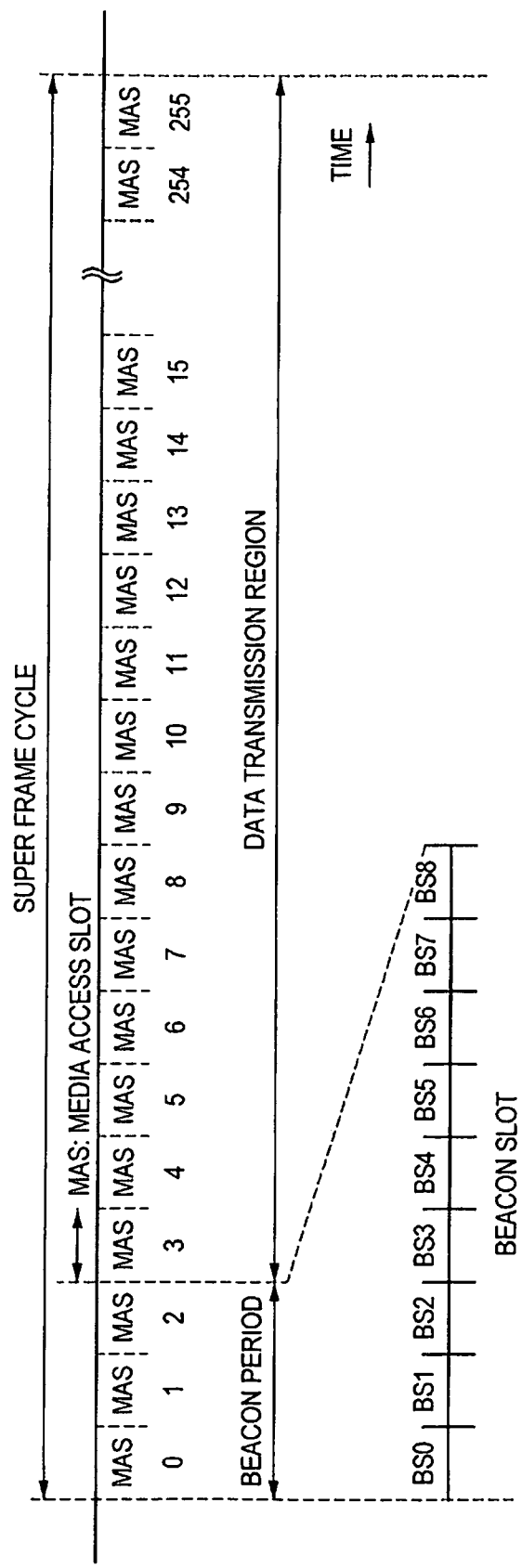
FIG. 2 is an explanatory diagram showing an example of the structure of a super frame.

FIG. 2 is an explanatory diagram showing an example of the structure of a super frame. The super frame cycle is defined by a predetermined time (for example, 65 ms), and is divided into 256 media access slots (MAS). The wireless communication devices 10 that form one wireless network share the super frame cycle as a specified period frame, and the above-described divided MAS are used as units to transfer messages.

In addition, there is a beacon period (BP) that serves as a management domain for transmitting and receiving management information using a beacon (a beacon signal) at the head of the super frame, and beacon slots (BS) are arranged at specified intervals. Each of the wireless communication devices 10 is set with a unique beacon slot, and can exchange parameters for performing network management or access control with the wireless communication devices 10 in the vicinity. FIG. 2 shows an example in which 9 beacon slots are set, namely, BS0 to BS9, as the beacon period. Note that, the period that is not set as the beacon period is normally used as a data transmission region.

Figure 3:
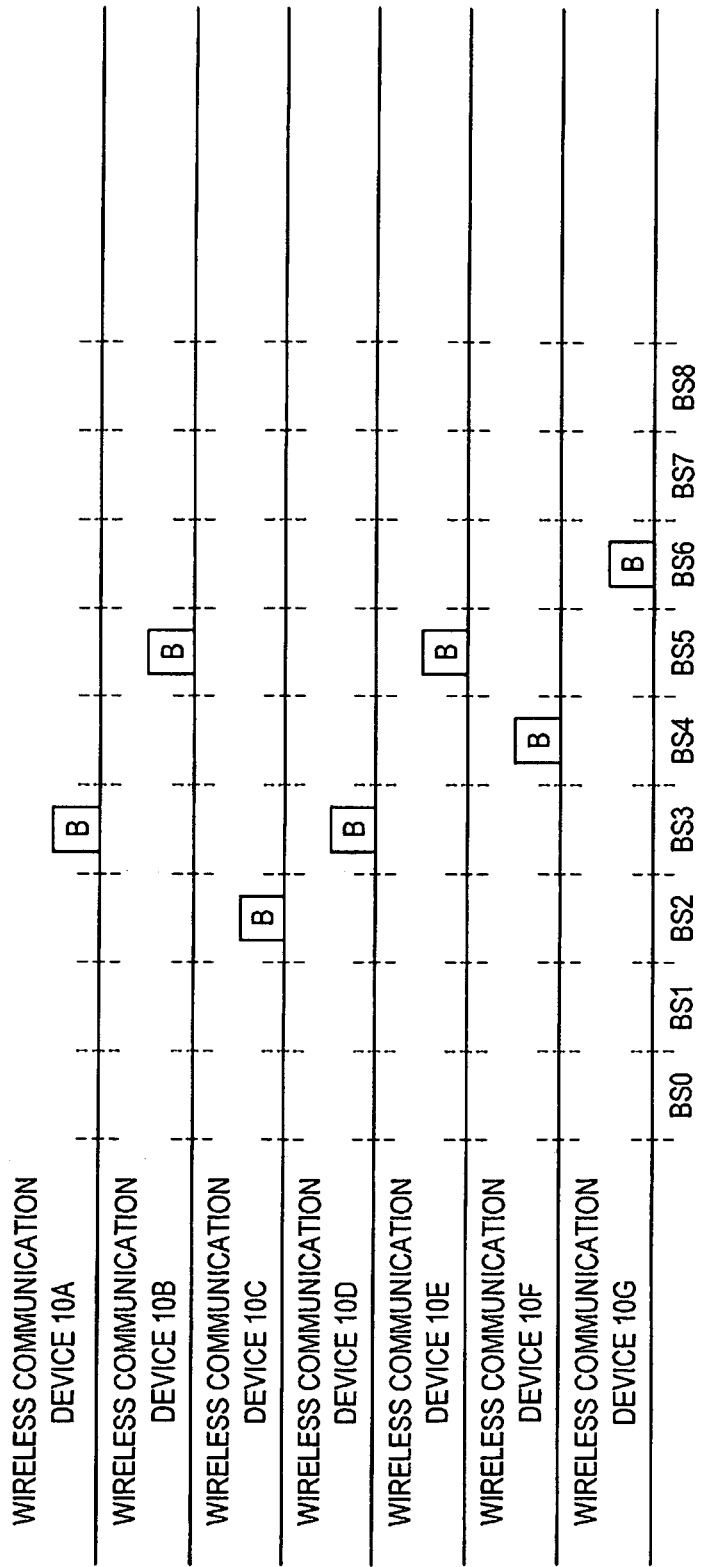
FIG. 3 is a conceptual diagram showing respective beacon slot positions that are set by each wireless communication device for itself.

FIG. 3 is a conceptual diagram showing beacon slot positions that are set by each of the wireless communication devices 10 for itself in a case in which the wireless communication device 10A to the wireless communication device 10G form one wireless communication system. Here, FIG. 3 shows a state where, after all of the wireless communication devices 10 that form one wireless communication system 1 have notified each other about un-occupied beacon slots, each of the wireless communication devices 10 has selected the beacon slot it is going to use.

In the example shown in FIG. 3, the wireless communication device 10A transmits its beacon using BS3, and the wireless communication device 10B transmits its beacon using BS5. Similarly, the wireless communication device 10C transmits its beacon using BS2, and the wireless communication device 10D transmits its beacon using BS3. The wireless communication device 10E transmits its beacon using BS5. Further, the wireless communication device 10F transmits its beacon using BS4, and the wireless communication device 10G transmits its beacon using BS6.

In the example shown in FIG. 3, the wireless communication device 10A and the wireless communication device 10D share use of the shared BS3, and the wireless communication device 10B and the wireless communication device 10E share use of the shared BS5. However, the wireless communication device 10A and the wireless communication device 10D are 3 hops or more away from each other, and the wireless communication device 10B and the wireless communication device 10E are also 3 hops or more away from each other. Therefore, it is assumed that a plurality of wireless communication devices can use the shared BS without any practical problem.

Note that, in order that a wireless communication device can newly join the wireless communication system 1, BS0, BS1, BS7 and BS8 can be reserved as necessary. Normally, a specified number of free beacon slots are provided after the beacon slot of each of the wireless communication devices 10. The free beacon slots are provided in case a wireless communication device newly joins the wireless communication system 1.

1-3. TFC Code

Next, a time frequency code (TFC) will be described with reference to FIG. 4 and FIG. 5.

Figure 4:
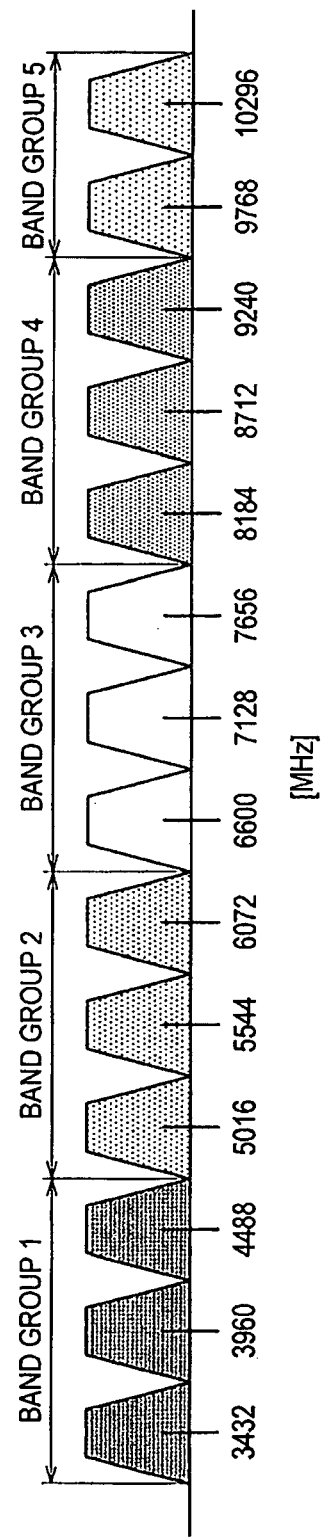
FIG. 4 is an explanatory diagram showing the configuration of a frequency frequency-use method of a multiband orthogonal frequency division multiplexing (OFDM) system.

FIG. 4 is an explanatory diagram showing the configuration of a frequency-use method of a multiband orthogonal frequency division multiplexing (OFDM) system. As shown in FIG. 4, in the Wimedia Alliance Multi Band OFDM PHY specification, it is defined that 14 sub bands, each with a 528 MHz bandwidth, are allocated between 3.1 GHz and 10.6 GHz.

In addition, a band group 1, a band group 2, a band group 3, and a band group 4 are formed by delimiting groups of 3 sub bands in order from the low frequency sub bands. The remaining 2 sub bands form a band group 5.

By changing the frequency hopping pattern for each of the band groups described above, a plurality of TFC codes 1 to 10 shown in FIG. 5A to FIG. 5J can be configured.

Figure 5B:
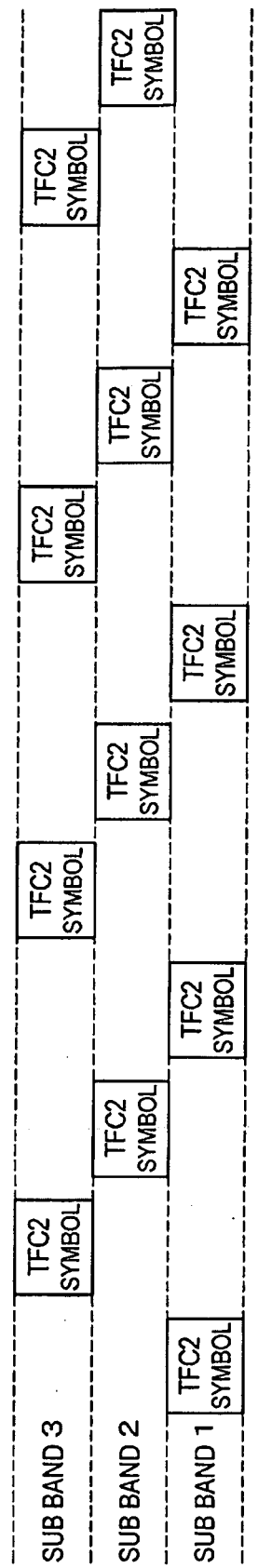
FIG. 5B is an explanatory diagram showing a frequency hopping pattern of TFC 2.
Figure 5C:
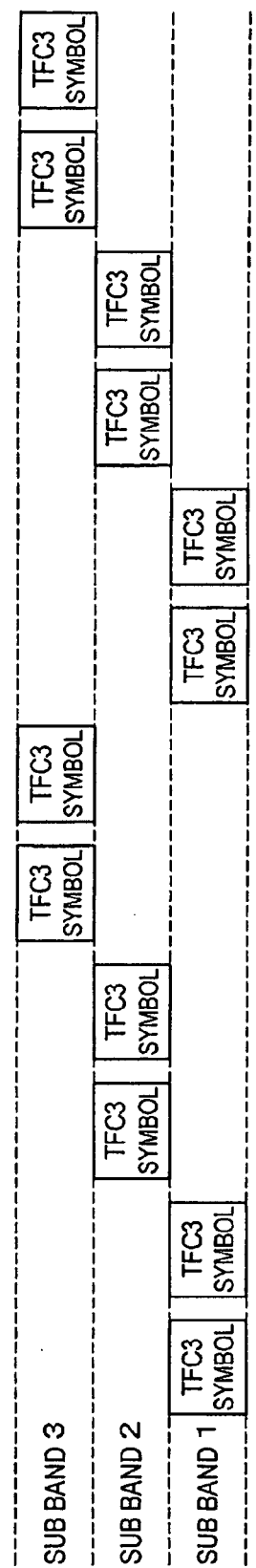
FIG. 5C is an explanatory diagram showing a frequency hopping pattern of TFC 3.
Figure 5D:
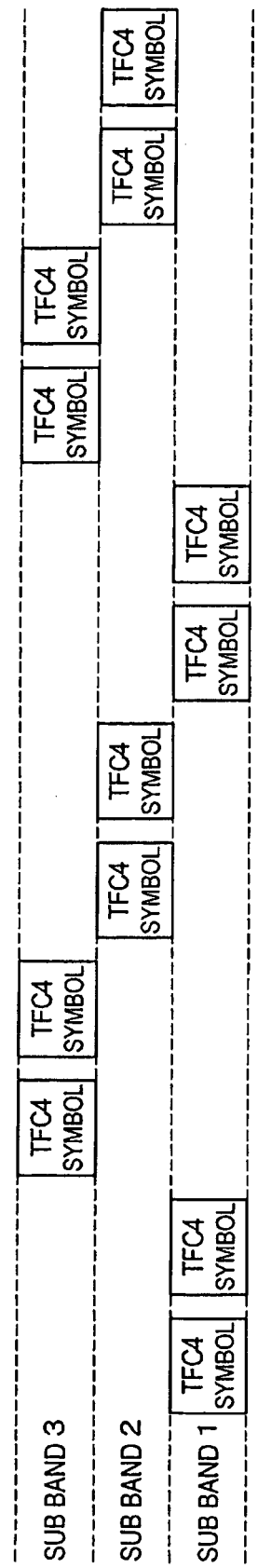
FIG. 5D is an explanatory diagram showing a frequency hopping pattern of TFC 4.
Figure 5E:
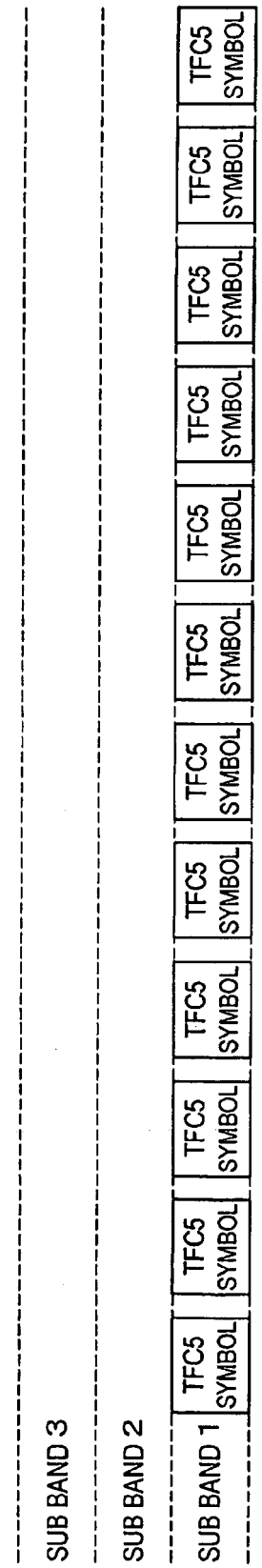
FIG. 5E is an explanatory diagram showing a frequency hopping pattern of TFC 5.
Figure 5F:
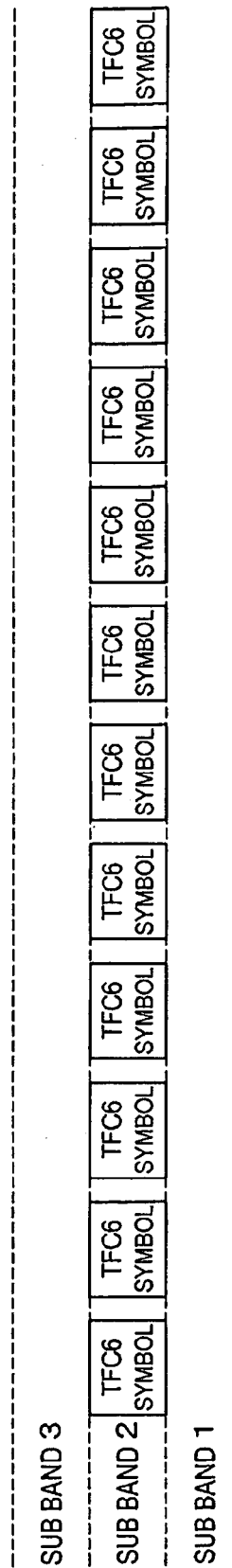
FIG. 5F is an explanatory diagram showing a frequency hopping pattern of TFC 6.
Figure 5G:
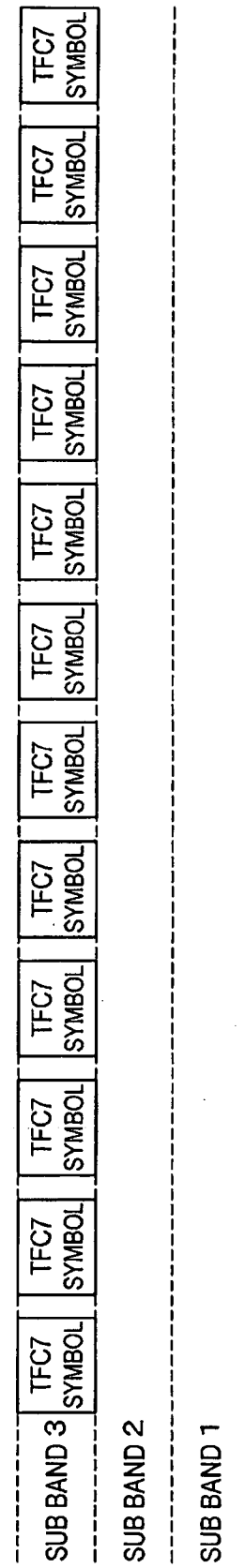
FIG. 5G is an explanatory diagram showing a frequency hopping pattern of TFC 7.
Figure 5H:
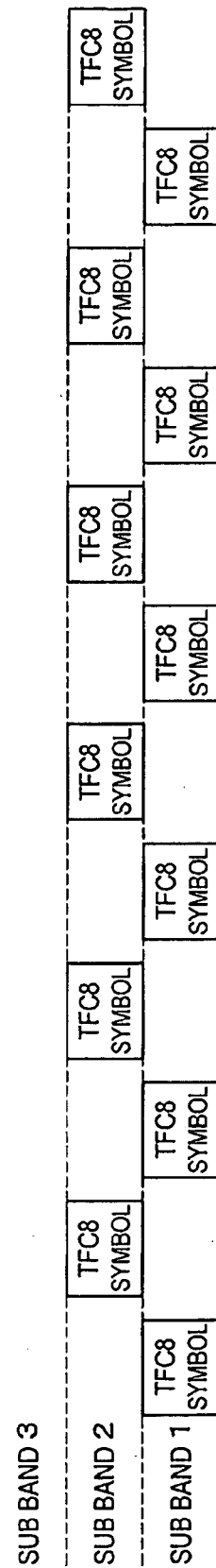
FIG. 5H is an explanatory diagram showing a frequency hopping pattern of TFC 8.
Figure 5I:
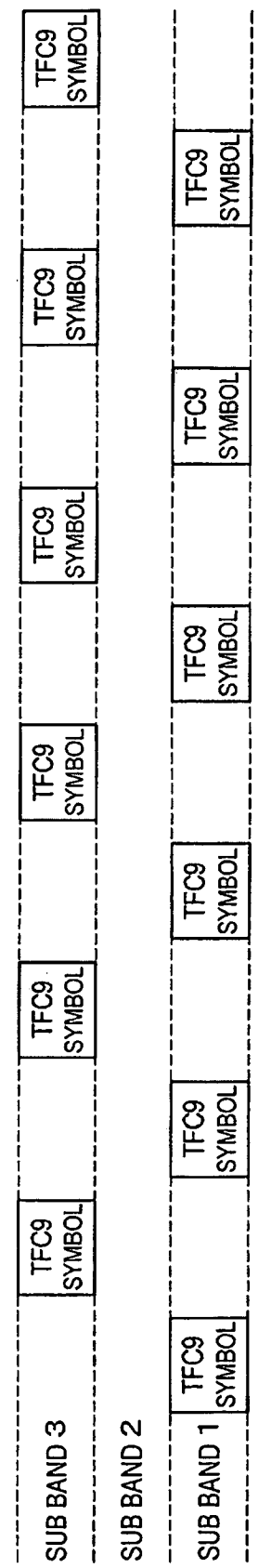
FIG. 5I is an explanatory diagram showing a frequency hopping pattern of TFC 9.
Figure 5J:
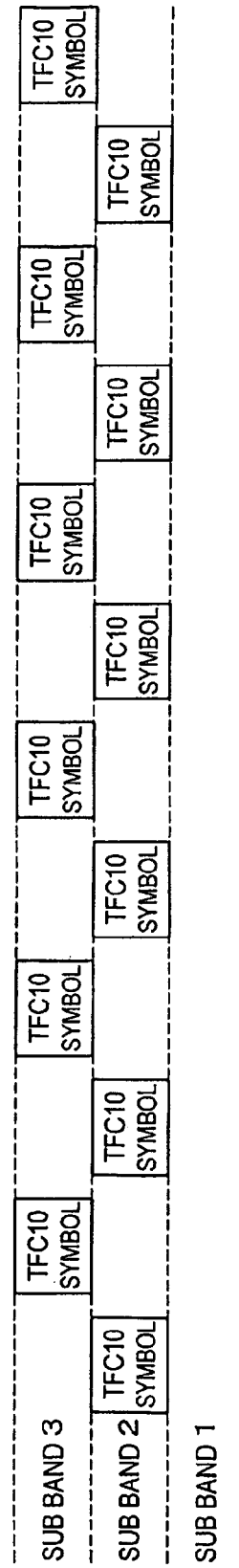
FIG. 5J is an explanatory diagram showing a frequency hopping pattern of TFC 10.

FIG. 5A to FIG. 5J are explanatory diagrams each showing an example of a frequency hopping pattern of each of the TFC codes. More specifically, FIG. 5A shows a frequency hopping pattern of TFC 1, FIG. 5B shows a frequency hopping pattern of TFC 2, FIG. 5C shows a frequency hopping pattern of TFC 3, FIG. 5D shows a frequency hopping pattern of TFC 4, FIG. 5E shows a frequency hopping pattern of TFC 5, FIG. 5F shows a frequency hopping pattern of TFC 6, FIG. 5G shows a frequency hopping pattern of TFC 7, FIG. 5H shows a frequency hopping pattern of TFC 8, FIG. 5I shows a frequency hopping pattern of TFC 9, and FIG. 5J shows a frequency hopping pattern of TFC 10.

The frequency hopping pattern is defined by a channel (frequency-use method) code called TFC. For example, when the frequency-use method is TFC 1, the sub band that is used is changed in accordance with the rule sub band 1, sub band 2, sub band 3, sub band 1, sub band 2, sub band 3 as shown in FIG. 5A. Note that, among the sub bands forming a certain band group, the sub band with the lowest frequency band may be sub band 1, the sub band with the highest frequency band may be sub band 3, and the intermediate sub band between the sub band 1 and the sub band 3 may be sub band 2.

In addition, when the frequency-use method is TFC 2, the sub band that is used is changed in accordance with the rule sub band 1, sub band 3, sub band 2, sub band 1, sub band 3, sub band 2 as shown in FIG. 5B.

When the frequency-use method is TFC 3, the sub band that is used is changed in accordance with the rule sub band 1, sub band 1, sub band 2, sub band 2, sub band 3, sub band 3 as shown in FIG. 5C. Similarly, when the frequency-use method is TFC 4, the sub band that is used is changed in accordance with the rule sub band 1, sub band 1, sub band 3, sub band 3, sub band 2, sub band 2 as shown in FIG. 5D.

In the multi band OFDM system, patterns in which the same sub band continues to be used are pre-set such as TFC 5 to TFC 7.

For example, when the frequency-use method is TFC 5, sub band 1 is continuously used as shown in FIG. 5E. When the frequency-use method is TFC 6, sub band 2 is continuously used as shown in FIG. 5F. Similarly, when the frequency-use method is TFC 7, sub band 3 is continuously used as shown in FIG. 5G.

In addition, patterns in which frequency hopping is performed between two sub bands are pre-set such as TFC 8 to TFC 10.

More specifically, as shown in FIG. 5H, when the frequency-use method is TFC 8, only sub band 1 and sub band 2 are alternately used. Further, as shown in FIG. 5I, when the frequency-use method is TFC 9, only sub band 1 and sub band 3 are alternately used. Similarly, as shown in FIG. 5J, when the frequency-use method is TFC 10, only sub band 2 and sub band 3 are alternately used. In this manner, the frequency hopping pattern to be used is determined by the set TFC code.

Further, a specified preamble sequence that corresponds with each TFC code is pre-set in the used TFC code. The preamble is a synchronization signal that is attached to the signal that is transmitted/received. Note that the square frames shown in FIG. 5A to FIG. 5J may be one OFDM symbol, or may be data transmitted in a 312.5 ns duration time interval.

2. BACKGROUND OF PRESENT EMBODIMENT

The wireless communication system 1 according to the present embodiment is briefly explained above with reference to FIG. 1 to FIG. 5. Next, the background to the present embodiment will be explained with reference to FIG. 6 and FIG. 7.

In the WiMedia Distributed MAC Layer Specification, it is stated that when wireless communication devices start operation, it is desirable for them to perform scans for all TFC codes to ascertain the presence of other wireless communication devices in the vicinity. Also, it is necessary to perform each TFC scan over a period in excess of the super frame cycle.

Further, when wireless communication devices select one TFC and form a network, when the number of DRP ("distributed reservation protocol") reservations increases in the network and continuous operation of the network becomes difficult, other TFC codes can be scanned and the TFC code can be switched depending on the results of the scan. Changes in the status of such a related to the present embodiment have been summarized as shown in FIG. 6.

FIG. 6 is an explanatory diagram showing changes in the status of the wireless communication device related to the present embodiment. As shown in FIG. 6, the wireless communication device related to the present embodiment is in a state ST0 when the power source is switched off. When the power source is switched on, the state of the wireless communication device related to the present embodiment becomes ST1, in which each TFC scan is performed. Then, when the wireless communication device related to the present embodiment selects the TFC code depending on the scanning results, it changes to status ST2, in which it operates normally in the network.

In the state ST2, if there is a request to reset the network structure, or if the TFC code is changed due to congestion of the network etc., the wireless communication device related to the present embodiment moves to the state ST1 in which it performs each TFC scan. Also, if the power source is interrupted in the state ST2, the wireless communication device related to the present embodiment moves to the state ST0.

In this way, it is necessary for the wireless communication device related to the present embodiment to perform each TFC scan in a variety of situations. However, as explained above, when there are, for example, ten types of TFC code, it is necessary for the wireless communication device related to the present embodiment to switch the TFC code approximately ten times at least when performing the scanning operation, as shown in FIG. 7.

Figure 7:
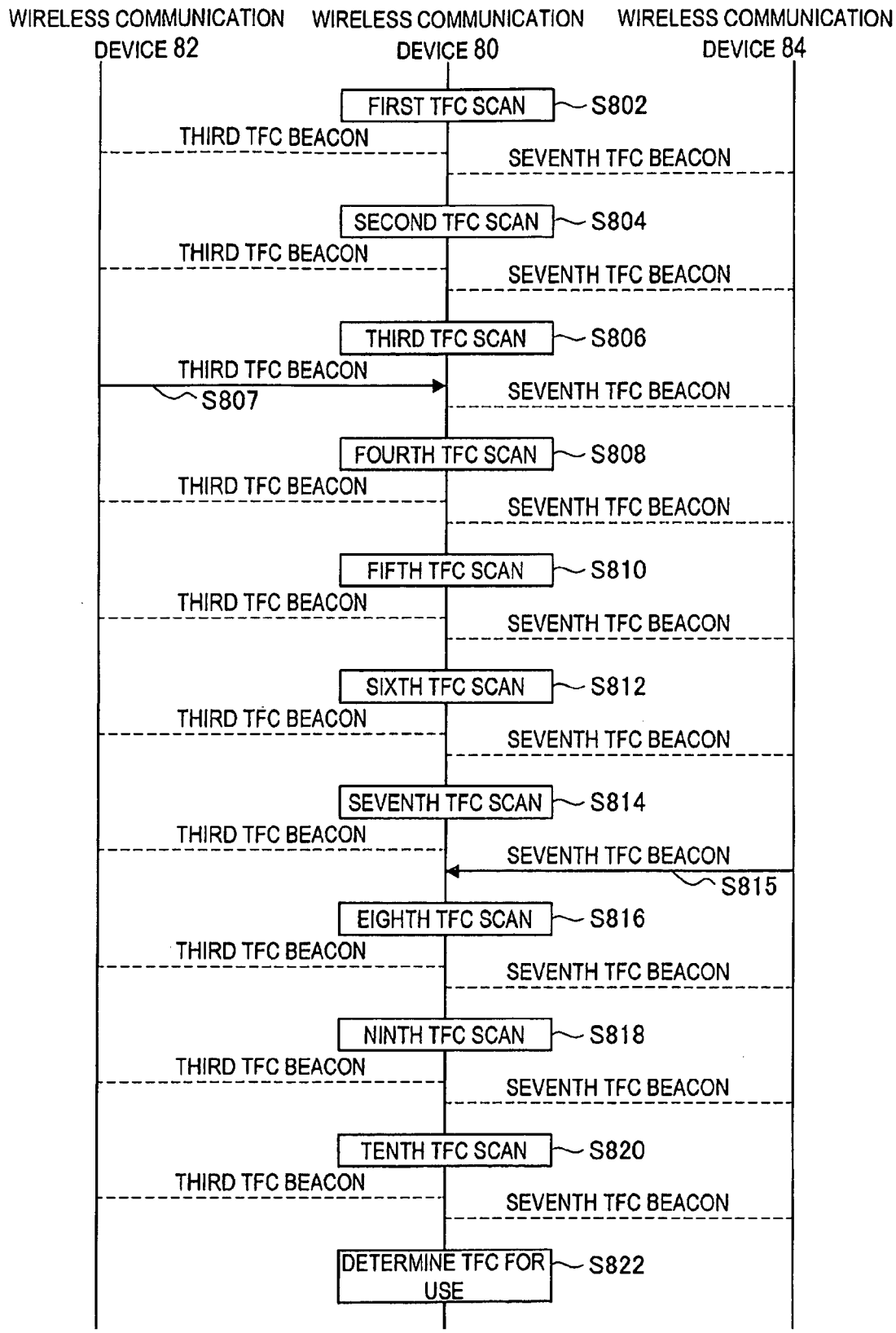
FIG. 7 is a sequence diagram showing the flow of a scanning operation by a wireless communication device related to the present embodiment.

FIG. 7 is a sequence diagram showing the flow of a scanning operation by the wireless communication device related to the present embodiment. FIG. 7 shows an operation example in which, in the vicinity of a wireless communication device 80 that performs the scanning operation, there are a wireless communication device 82 that operates using TFC 3 and a wireless communication device 84 that operates using TFC 7.

In this case, the wireless communication device 80 first selects TFC 1 and performs a TFC 1 scan over, for example, a predetermined number of super frame cycles (step S802). However, the peripheral wireless communication device 82 is transmitting beacons using TFC 3 and the wireless communication device 84 is transmitting beacons using TFC 7, and the wireless communication device 80 therefore does not receive a wireless signal from the wireless communication device 82 and the wireless communication device 84.

After that, the wireless communication device 80 selects TFC 2 and performs a TFC 2 scan over, for example, a predetermined number of super frames (step S804). However, the peripheral wireless communication device 82 is transmitting beacons using TFC 3 and the wireless communication device 84 is transmitting beacons using TFC 7, and the wireless communication device 80 therefore does not receive a wireless signal from the wireless communication device 82 and the wireless communication device 84.

Additionally, the wireless communication device selects TFC 3 and performs a TFC 3 scan over, for example, a predetermined number of super frames (step S806). Here, as the wireless communication device 82 is transmitting beacons using TFC 3, the wireless communication device 80 receives a beacon from the wireless communication device 82 and detects the presence of the wireless communication device 82 (step S807).

In the same way, the wireless communication device 80 selects TFC 4 to TFC 10 in order and performs TFC 4 to TFC 10 scans in order (step S808 to step S820). Here, when scanning using TFC 7, the wireless communication device 80 receives a beacon transmitted by the wireless communication device 84 and detects the presence of the wireless communication device 84 (step S815). Then, the wireless communication device 80 determines which TFC code to use depending on the results of each TFC scan (step S822).

In this way, when ten types of TFC code exist, for example, the wireless communication device related to the present embodiment requires a time period in excess of ten super frame cycles to perform the scanning operation. For that reason, from the point at which the power source is switched on, the wireless communication device requires several seconds of time to ascertain the presence of other wireless communication devices in the vicinity, select which TFC to use in actuality for its own device and then start operation of the wireless network. Moreover, in order to accurately ascertain the presence of other wireless communication devices, it is necessary to perform each TFC scan over three to four super frame cycles.

Further, when switching to another TFC code, the wireless communication device related to the present embodiment performs scanning in advance, as shown in FIG. 6. In this case, the wireless communication device related to the present embodiment needs to temporarily stop operation using the existing TFC code, thus impairing smooth operation of the network.

In light of the above-described circumstances, the wireless communication device 10 has been created. With the wireless communication device 10 according to the present embodiment, each TFC scan can be performed rapidly and the scanning operation can be performed while continuing normal operation. Below, the wireless communication device 10 according to the present embodiment will be explained in detail.

Figure 8:
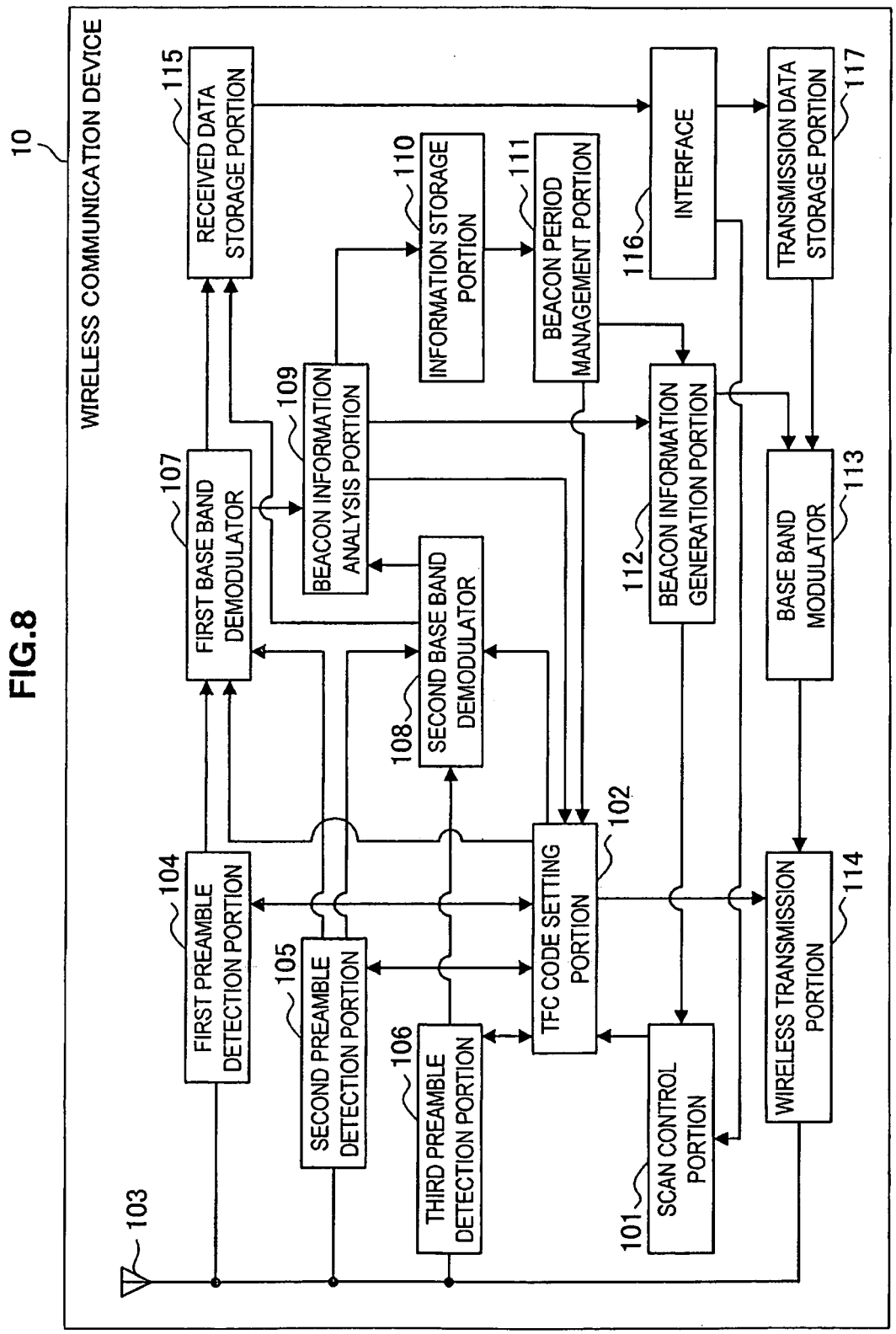
FIG. 8 is a functional block diagram showing a configuration of a wireless communication device according to the present embodiment.

3. DETAILED EXPLANATION OF PRESENT EMBODIMENT 3-1. Configuration of Wireless Communication Device According to Present Embodiment FIG. 8 is a functional block diagram showing the configuration of the wireless communication device 10 according to the present embodiment. As shown in FIG. 8, the wireless communication device 10 according to the present embodiment includes a scan control portion 101, a TFC code setting portion 102, an antenna 103, a first preamble detection portion 104, a second preamble detection portion 105, a third preamble detection portion 106, a first baseband demodulator 107, a second baseband demodulator 108, a beacon information analysis portion 109, an information storage portion 110, a beacon period management portion 111, a beacon information generation portion 112, a baseband modulator 113, a wireless transmission portion 114, a received data storage portion 115, an interface 116 and a transmission data storage portion 117.

The scan control portion 101 performs each TFC scan by the wireless communication device 10. The TFC code setting portion 102 functions as the setting portion that sets the TFC preambles, which cause the scan to be performed, in the first preamble detection portion 104, the second preamble detection portion 105 and the third preamble detection portion 106. Note that the preamble has a signal pattern defined for each TFC, and is used as a synchronization signal attached at the beginning of the wireless signal. Below, changes in the status of the wireless communication device 10 caused by this kind of operation of the scan control portion 101 and the TFC code setting portion 102 will be explained with reference to FIG. 9.

Figure 9:
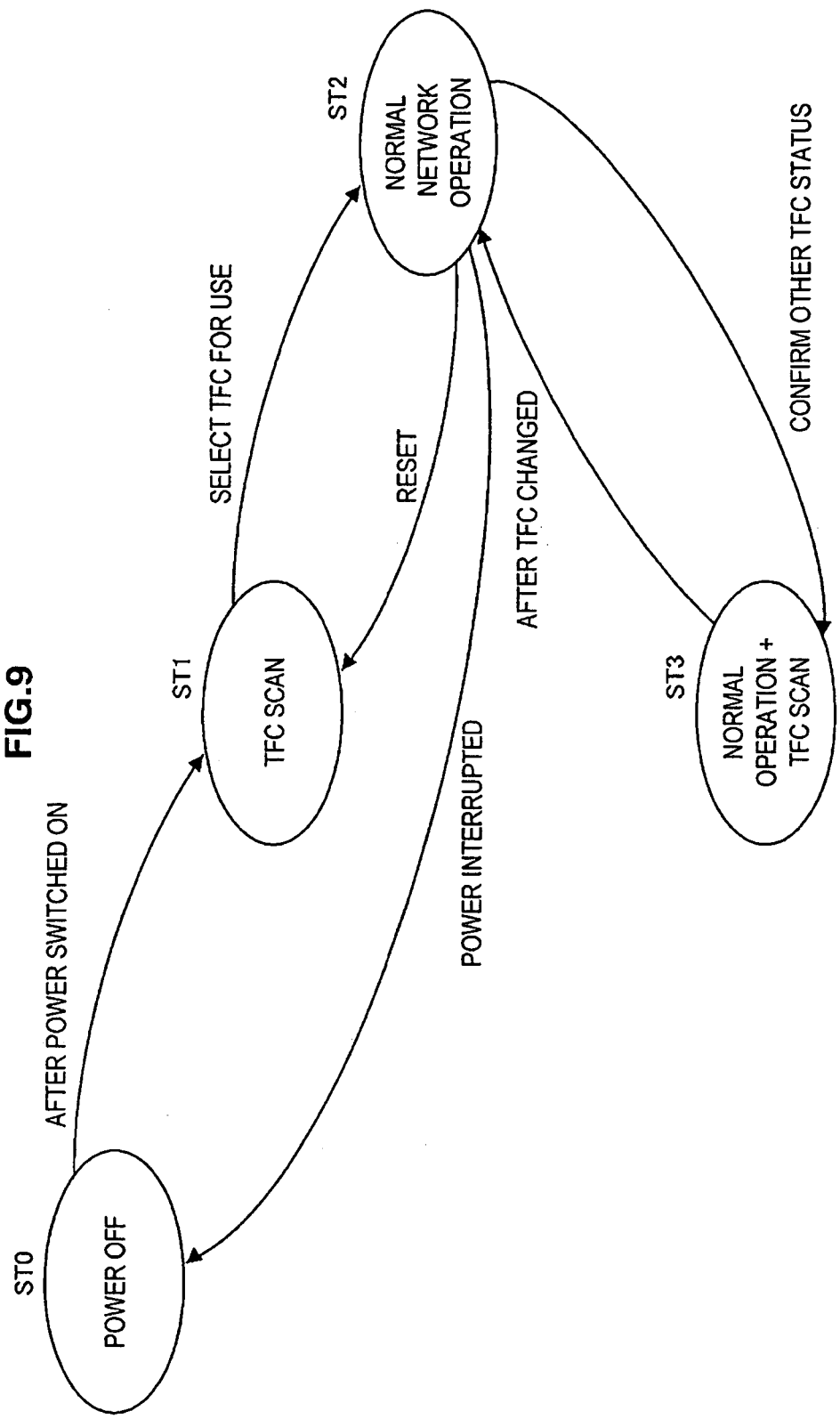
FIG. 9 is an explanatory diagram showing changes in the status of the wireless communication device according to the present embodiment.

FIG. 9 is an explanatory diagram showing changes in the status of the wireless communication device 10 according to the present embodiment. As shown in FIG. 9, the wireless communication device 10 is in a state ST0 when the power source is switched off. When the power source is switched on, the wireless communication device 10 moves to a state ST1 based on control by the scan control portion 101, and performs each TFC scan. In the present embodiment, as the TFC code setting portion 102 sets different TFC codes in the first preamble detection portion 104, the second preamble detection portion 105 and the third preamble detection portion 106, it is possible to scan a plurality of TFC codes in parallel.

Then, when the TFC code is selected by the TFC code setting portion 102 depending on the scan results, the wireless communication device 10 moves to a state ST2, in which it operates normally in a network. In the state ST2, if there is a request to reset the network structure, based on the control by the scan control portion 101, the wireless communication device 10 moves to the state ST1, in which it performs each TFC scan. Further, if the power source is interrupted in the state ST2, the wireless communication device 10 moves to the state ST0.

On the other hand, when the wireless communication device 10 changes the TFC code due to high levels of interference or lack of bandwidth etc., based on control by the scan control portion 101, the wireless communication device 10 moves to a state ST3, in which it performs a scanning operation while maintaining normal operation. In other words, the wireless communication device 10 according to the present embodiment can perform the scanning operation without stopping normal network operation. Then, when the TFC code setting portion 102 selects the TFC code depending on the scan results, the wireless communication device 10 once more moves to the state ST2, in which it operates normally in the network.

Note that the scanning operation corresponds to a process in which the preamble detection portions 104 to 106 stand-by over a predetermined period of time to wait for reception of wireless signals transmitted using the TFC codes set in the preamble detection portions 104 to 106.

Returning to the explanation of the wireless communication device 10 with reference to FIG. 8, the antenna 103 is an interface with other wireless communication devices in the vicinity. The antenna 103 converts received wireless signals that are transmitted from other wireless communication devices in the vicinity into electrical signals, and converts electrical signals into wireless signals and transmits the wireless signals etc.

The first preamble detection portion 104 functions as a reception portion that detects a preamble corresponding to a TFC code set by the TFC code setting portion 102. In the same way, the second preamble detection portion 105 and the third preamble detection portion 106 also detect preambles corresponding to TFC codes set by the TFC code setting portion 102.

When a preamble has been detected by the first preamble detection portion 104 or the second preamble detection portion 105, the first baseband demodulator 107 demodulates data that follows on from the preamble. Similarly, when a preamble has been detected by the second preamble detection portion 105 or the third preamble detection portion 106, the second baseband demodulator 108 demodulates data that follows on from the preamble.

The beacon information analysis portion 109 analyses information included in beacons demodulated by the first baseband demodulator 107 or by the second baseband demodulator 108. Here, the structure of a beacon frame will be explained with reference to FIG. 10.

Figure 10:
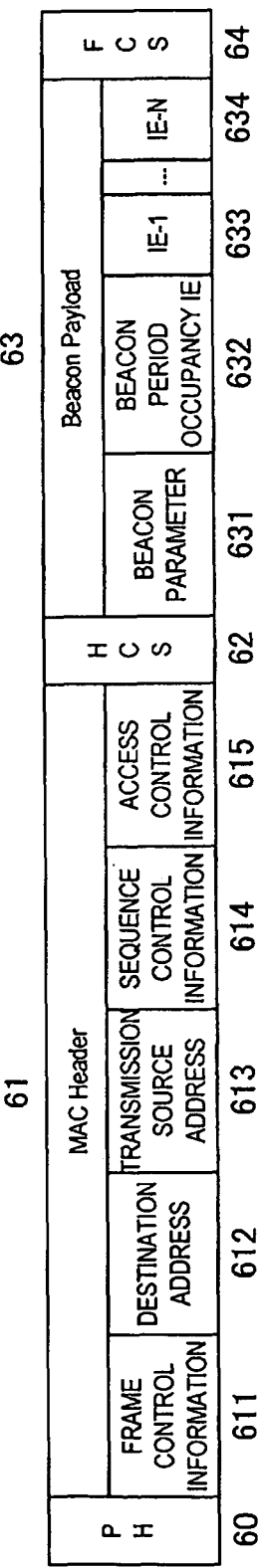
FIG. 10 is an explanatory diagram showing an example of the structure of a beacon frame.

FIG. 10 is an explanatory diagram showing an example of the configuration of a beacon frame. As shown in FIG. 10, the beacon includes a PHY header (PH) 60, a MAC header 61, a header check sequence (HCS) 62, a beacon payload 63 and a frame check sequence (FCS) 64.

As shown in FIG. 10, the MAC header 61 includes frame control information 611, a destination address 612 that identifies a wireless communication device on the receiving side, a source address 613 that identifies a wireless communication device on the transmission side, a sequence control information 614 such as a sequence number, and an access control information 615 that describes parameters necessary for access control.

The beacon payload 63 includes a beacon parameter 631, a beacon period occupancy information element 632, a first information element 633 and an N-th information element 634. Note that "N" here denotes the number of information elements that are transmitted by being attached to each beacon. "N" may take a different value for each respective beacon transmitted. Further, each information element may be added or deleted as necessary to structure a beacon frame.

The information storage portion 110 stores information about peripheral wireless communication devices as described in this type of beacon (for example, beacon slot, operation status, reservation status). Then, based on the information about the peripheral wireless communication devices stored in the information storage portion 110, the beacon period management portion 111 selects and manages a beacon slot that does not conflict with the peripheral wireless communication devices etc.

The beacon information generation portion 112 generates the beacon described with reference to FIG. 10. Then, the baseband modulator 113 modulates the beacon generated by the beacon information generation portion 112 and also modulates the data stored in the transmission data storage portion 117. After that, the wireless communication portion 114 performs processing necessary to transmit the modulated data from the antenna 103 in accordance with a predetermined TFC code. Note that the wireless communication portion 114 functions as a transmission portion that performs a transmission process using the TFC code set by the TFC code setting portion 102.

The received data storage portion 115 stores data demodulated by the first baseband demodulator 107 or data demodulated by the second baseband demodulator 108. The interface 116 receives and transfers to a connected application device received data that is stored in the received data storage portion 115, and also receives transmission data to be stored in the transmission data storage portion 117 from the application device. The transmission data storage portion 117 stores transmission data acquired from the application device via the interface 116.

Next, examples of TFC code setting by the TFC code setting portion 102 at the time of scanning will be explained with reference to FIG. 11 to FIG. 14.

First Example

Figure 11:
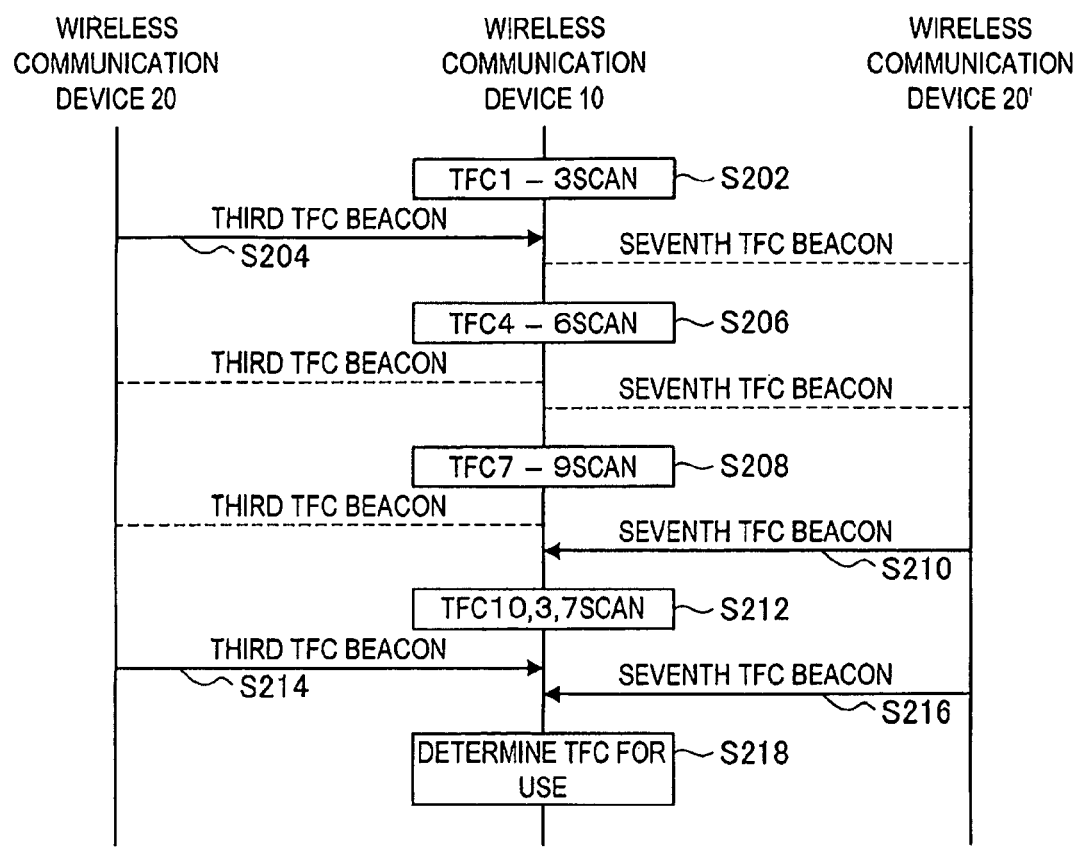

FIG. 11 is an explanatory diagram showing a first example of TFC code setting performed by the TFC code setting portion 102 in order to perform scanning when the power source is switched on. The example in FIG. 11 shows a case in which, in the vicinity of the wireless communication device 10 that performs the scanning operation, are a wireless communication device 20 that operates using TFC 3, and a wireless communication device 20' that operates using TFC 7.

In this case, the TFC code setting portion 102 of the wireless communication device 10 sets TFC 1-3 in each of the preamble detection portions 104 to 106 respectively, and causes them to perform a TFC 1-3 scan (step S202). Here, as the wireless communication device 20 is transmitting beacons using TFC 3, the wireless communication device 10 therefore receives a beacon from the wireless communication device 20 and detects the presence of the wireless communication device 20 (step S204). Then, information described in the beacon is stored in the information storage portion 110.

After that, the TFC code setting portion 102 sets TFC 4-6 in each of the preamble detection portions 104 to 106 respectively and causes them to perform a TFC 4-6 scan (step S206). However, as the peripheral wireless communication device 20 is transmitting beacons using TFC 3 and the wireless communication device 20' is transmitting beacons using TFC 7, the wireless communication device 10 does not receive any beacon from the wireless communication device 20 and the wireless communication device 20'.

Next, the TFC code setting portion 102 sets TFC 7-9 in each of the preamble detection portions 104 to 106 respectively and causes them to perform a TFC 7-9 scan (step S208). Here, as the wireless communication device 20' is transmitting beacons using TFC 7, the wireless communication device 10 therefore receives a beacon from the wireless communication device 20' and detects the presence of the wireless communication device 20' (step S210). Then, information described in the beacon is stored in the information storage portion 110.

In addition, the TFC code setting portion 102, as well as setting the remaining TFC 10 in the first preamble detection portion 104, sets TFC 3, which received a beacon, in the second preamble detection portion 105 and sets TFC 7, which received a beacon, in the third preamble detection portion 106 (step S212). Here, as the wireless communication device 20 is transmitting beacons using TFC 3, the wireless communication device 10 receives a beacon from the wireless communication device 20 and detects the presence of the wireless communication device 20 (step S224). Also, as the wireless communication device 20' is transmitting beacons using TFC 7, the wireless communication device 10 receives a beacon from the wireless communication device 20' and detects the presence of the wireless communication device 20' (step S226).

After that, based on the results of the scanning performed at steps S202 to step S212, the wireless communication device 10 sets the TFC code to be used for operation in one of the preamble detection portions 104 to 106 (step S218). For example, the TFC code setting portion 102 may set a TFC code for which a beacon was received. Further, the TFC code setting portion 102, based on the information described in the beacons, may set a TFC code that has a lower volume of reservations.

In this way, in the first operation example, the TFC code setting portion 102 once more sets any TFC for which a beacon is received in one of the preamble detection portions 104 to 106. With this configuration, it is possible to re-check whether or not a TFC code for which a beacon is received is definitely being used in the vicinity. In addition, it is possible to select a TFC code for operation of the wireless communication device based on more recent beacon information.

Note that in the example shown in FIG. 11, when the TFC code setting portion 102 sets TFC 10 in the first preamble detection portion 104, it resets TFC codes for which a beacon is received in the remaining second preamble detection portion 105 and third preamble detection portion 106. However, if none of the preamble detection portions 104 to 106 remain after a series of TFC settings is complete, the TFC code setting portion 102 can use the next time period to set TFC codes for which a beacon is received in the preamble detection portions 104 to 106.

Second Example

Figure 12:
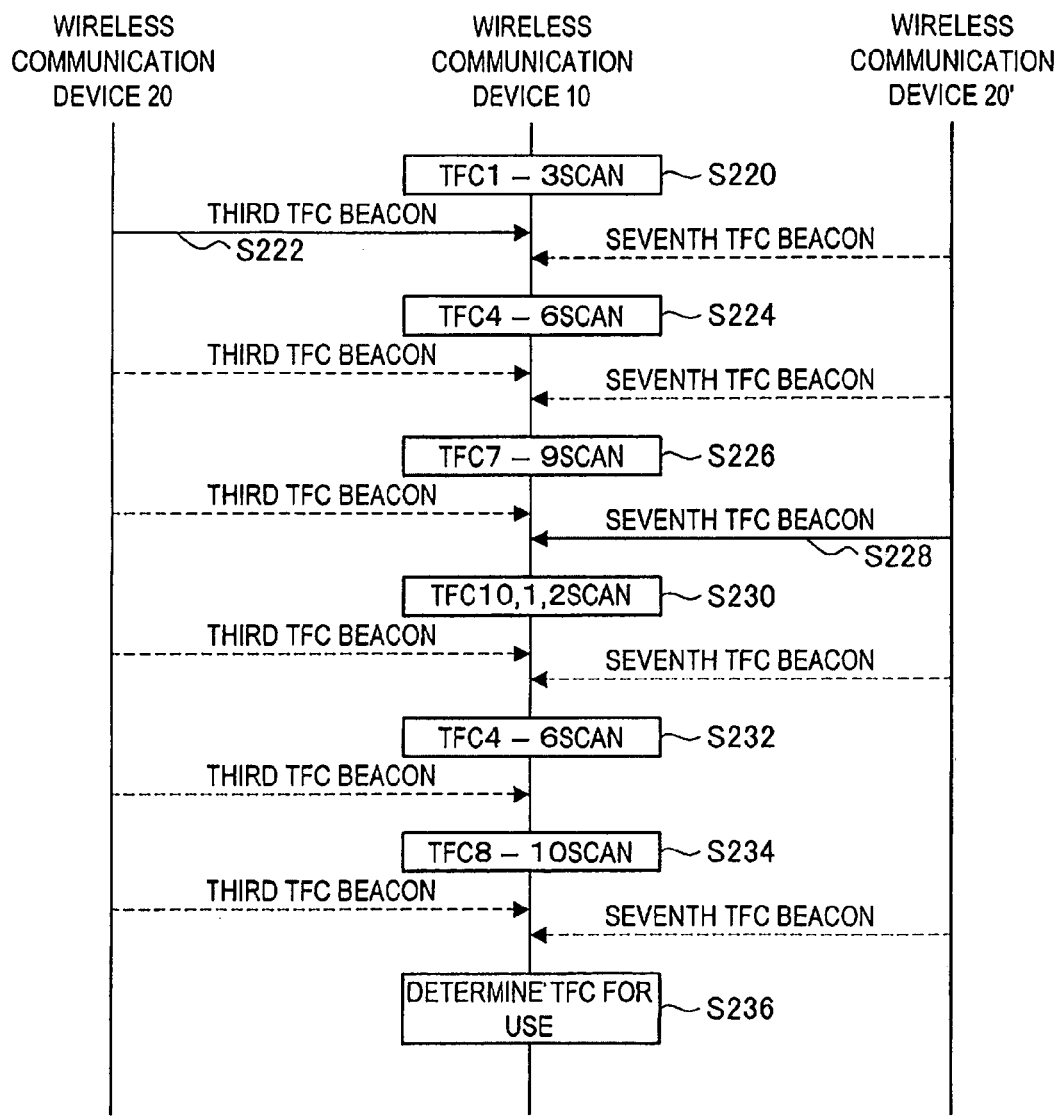

FIG. 11 is an explanatory diagram showing a second example of TFC code setting by the TFC code setting portion 102 in order to perform scanning when the power source is switched on. The example in FIG. 12 shows a case in which, in the vicinity of the wireless communication device 10 that performs the scanning operation, are a wireless communication device 20 that operates using TFC 3, and a wireless communication device 20' that operates using TFC 7.

In this case, the TFC code setting portion 102 of the wireless communication device 10 sets TFC 1-3 in each of the preamble detection portions 104 to 106 respectively, and causes them to perform a TFC 1-3 scan (step S220). Here, as the wireless communication device 20 is transmitting beacons using TFC 3, the wireless communication device 10 therefore receives a beacon from the wireless communication device 20 and detects the presence of the wireless communication device 20 (step S222). Then, information described in the beacon is stored in the information storage portion 110.

After that, the TFC code setting portion 102 sets TFC 4-6 in each of the preamble detection portions 104 to 106 respectively and causes them to perform a TFC 4-6 scan (step S224). However, as the peripheral wireless communication device 20 is transmitting beacons using TFC 3 and the wireless communication device 20' is transmitting beacons using TFC 7, the wireless communication device 10 does not receive any beacon from the wireless communication device 20 and the wireless communication device 20'.

Next, the TFC code setting portion 102 sets TFC 7-9 in each of the preamble detection portions 104 to 106 respectively and causes them to perform a TFC 7-9 scan (step S226). Here, as the wireless communication device 20' is transmitting beacons using TFC 7, the wireless communication device 10 therefore receives a beacon from the wireless communication device 20' and detects the presence of the wireless communication device 20' (step S228). Then, information described in the beacon is stored in the information storage portion 110.

In addition, the TFC code setting portion 102, as well as setting the remaining TFC 10 in the first preamble detection portion 104, sets TFC 1 and TFC 2, for which no beacon has been received, in the second preamble detection portion 105 and the third preamble detection portion 106 (step S230). However, as the peripheral wireless communication device 20 is transmitting beacons using TFC 3 and the wireless communication device 20' is transmitting beacons using TFC 7, the wireless communication device 10 does not receive any beacon from the wireless communication device 20 and the wireless communication device 20'.

Next, the TFC code setting portion 102 once more sets TFC 4 to TFC 6, for which no beacon has been received, in the preamble detection portions 104 to 106 (step S232). However, as the peripheral wireless communication device 20 is transmitting beacons using TFC 3 and the wireless communication device 20' is transmitting beacons using TFC 7, the wireless communication device 10 does not receive any beacon from the wireless communication device 20 and the wireless communication device 20'.

In addition, the TFC code setting portion 102 once more sets TFC 8 to TFC 10, for which no beacon has been received, in the preamble detection portions 104 to 106 (step S234). However, as the peripheral wireless communication device 20 is transmitting beacons using TFC 3 and the wireless communication device 20' is transmitting beacons using TFC 7, the wireless communication device 10 does not receive any beacon from the wireless communication device 20 and the wireless communication device 20'.

After that, based on the results of the scanning performed at steps S220 to step S234, the wireless communication device 10 sets the TFC code to be used for operation in one of the preamble detection portions 104 to 106 (step S236).

In this way, in the second operation example, the TFC code setting portion 102 once more sets TFC codes for which no beacon is received in the preamble detection portions 104 to 106. With this configuration, if a TFC code exists for which a beacon is accidentally not received in a previous scan, the TFC code can be more accurately detected.

Third Example

Figure 13:
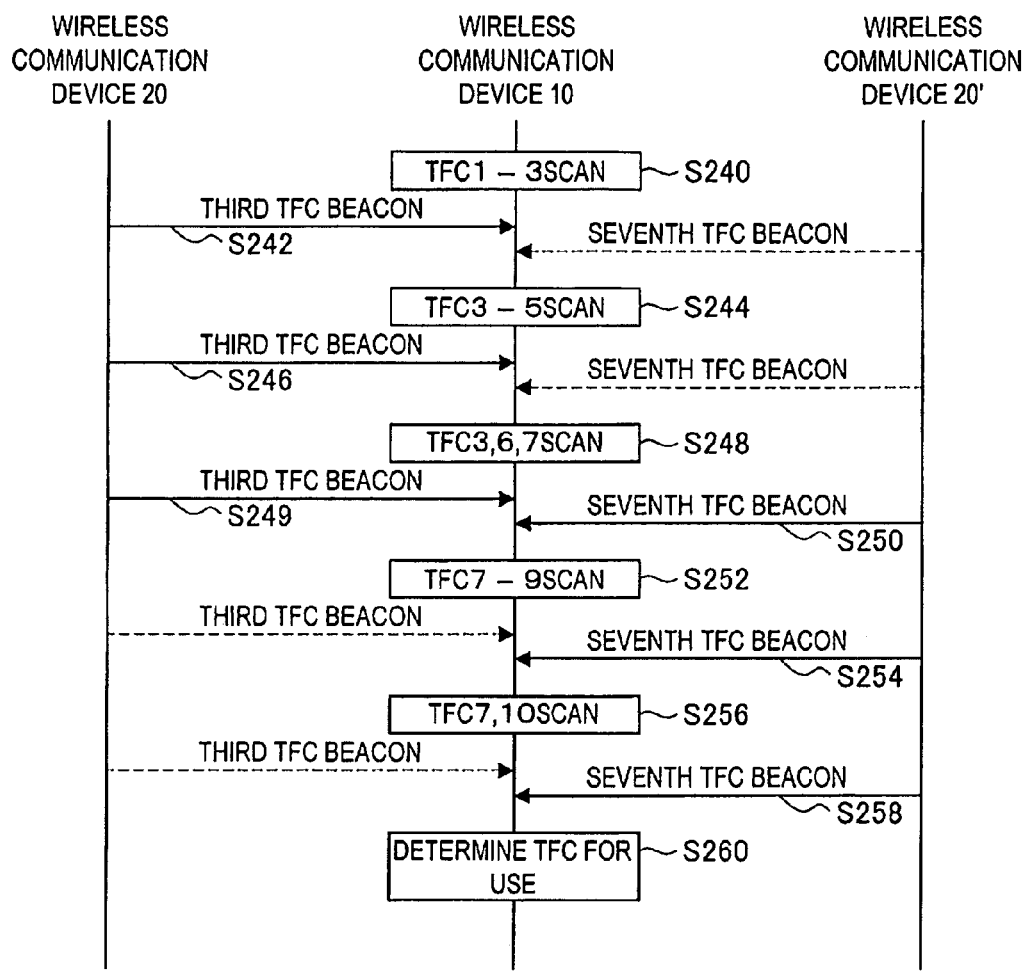

FIG. 13 is an explanatory diagram showing a third example of TFC code setting by the TFC code setting portion 102 in order to perform scanning when the power source is switched on. The example in FIG. 13 shows a case in which, in the vicinity of the wireless communication device 10 that performs the scanning operation, are a wireless communication device 20 that operates using TFC 3, and a wireless communication device 20' that operates using TFC 7.

In this case, the TFC code setting portion 102 of the wireless communication device 10 sets TFC 1-3 in each of the preamble detection portions 104 to 106 respectively, and causes them to perform a TFC 1-3 scan (step S240). Here, as the wireless communication device 20 is transmitting beacons using TFC 3, the wireless communication device 10 therefore receives a beacon from the wireless communication device 20 and detects the presence of the wireless communication device 20 (step S242). Then, information described in the beacon is stored in the information storage portion 110.

After that, the TFC code setting portion 102 sets TFC 3 continuously in the third preamble detection portion 106, which received a TFC 3 beacon, and sets TFC 4 and TFC 5 in the remaining first preamble detection portion 104 and second preamble detection portion 105 (step S244). Here, as the wireless communication device 20 is transmitting beacons using TFC 3, the wireless communication device 10 receives a beacon from the wireless communication device 20 and detects the presence of the wireless communication device 20 (step S246).

In addition, the TFC code setting portion 102 sets TFC 3 continuously in the third preamble detection portion 106, which received TFC 3, and sets TFC 6 and TFC 7 in the remaining first preamble detection portion 104 and second preamble detection portion 105 (step S248). Here, as the wireless communication device 20 is transmitting beacons using TFC 3, the wireless communication device 10 receives a beacon from the wireless communication device 20 and detects the presence of the wireless communication device 20 (step S249). Also, as the wireless communication device 20' is transmitting beacons using TFC 7, the wireless communication device 10 receives a beacon from the wireless communication device 20' and detects the presence of the wireless communication device 20' (step S250).

Next, the TFC code setting portion 102 sets TFC 7 continuously in the second preamble detection portion 105, which received a TFC 7 beacon. Further, as TFC 7 newly received a beacon, the TFC code setting portion 102 ends the TFC 3 scan which previously received a beacon, and sets TFC 8 and TFC 9 in the first preamble detection portion 104 and the third preamble detection portion 106 (step S252). Here, as the wireless communication device 20' is transmitting beacons using TFC 7, the wireless communication device 10 receives a beacon from the wireless communication device 20' and detects the presence of the wireless communication device 20' (step S254).

After that, the TFC code setting portion 102 sets TFC 7 continuously in the second preamble detection portion 105, which received a TFC 7 beacon, and sets the remaining TFC 10 in the first preamble detection portion 104 (step S256). Here, as the wireless communication device 20' is transmitting beacons using TFC 7, the wireless communication device 10 receives a beacon from the wireless communication device 20' and detects the presence of the wireless communication device 20' (step S260).

After that, based on the results of the scanning performed at steps S240 to step S256, the wireless communication device 10 sets the TFC code to be used for operation in one of the preamble detection portions 104 to 106 (step S260).

In this way, in the third operation example, TFC codes for which a beacon is received are continuously set. Here, there is a high possibility that the TFC code setting portion 102 will set a TFC code for which a beacon is received as the TFC code for normal operation. Therefore, by continuously scanning TFC codes for which a beacon is received in the way described above, information relating to the relevant TFC code can be continuously obtained from beacons, and the TFC code setting portion 102 can more accurately select a TFC code for normal operation. Additionally, when a TFC code is newly received, the continuous setting of the TFC code for which a beacon is previously received is discontinued, thus achieving rapid scanning of other TFC codes.

Fourth Example

Figure 14:
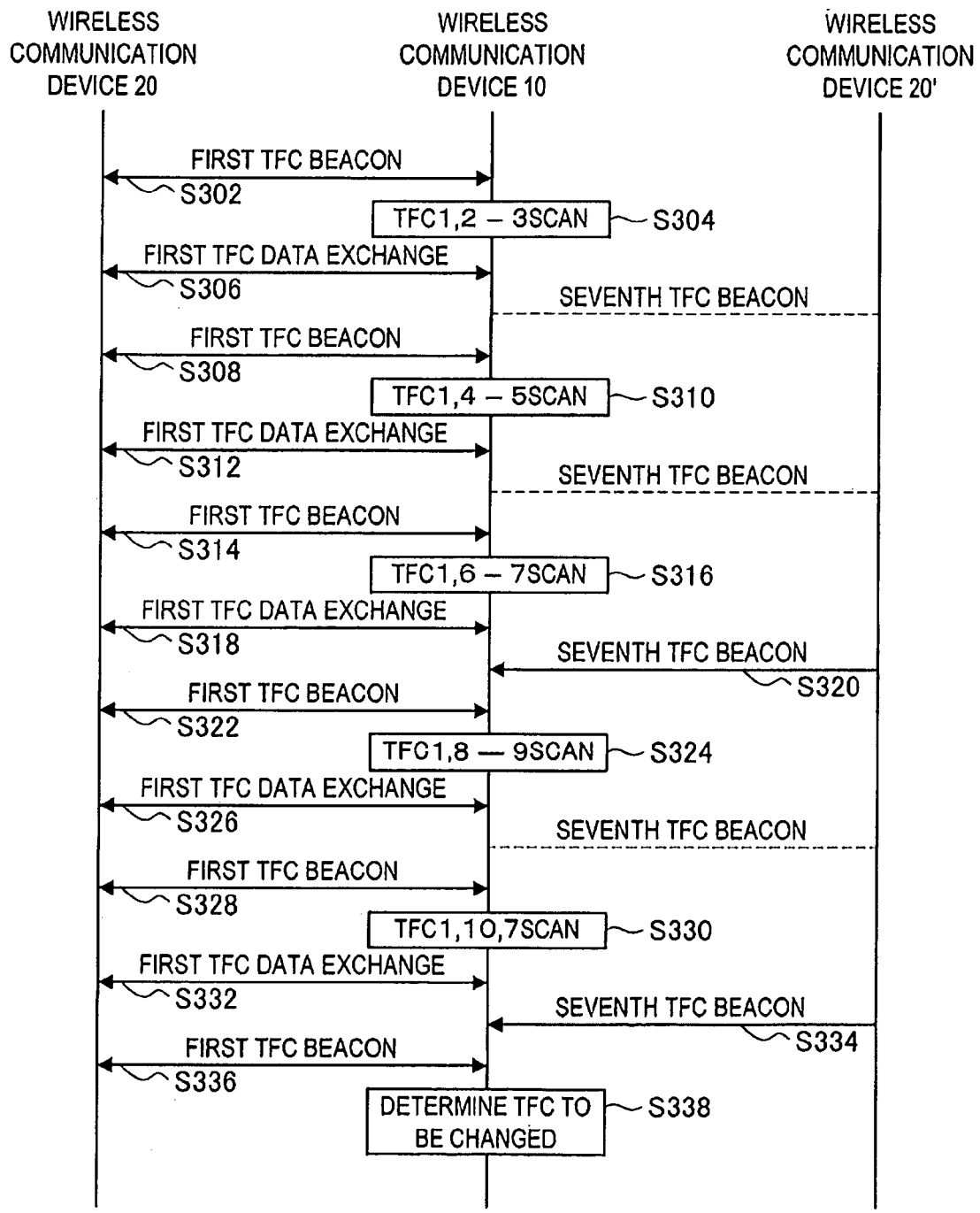

FIG. 14 is an explanatory diagram showing a fourth example of TFC code setting by the TFC code setting portion 102 in order to perform scanning when the power source is switched on. The example in FIG. 14 shows a case in which, in the vicinity of the wireless communication device 10 that performs the scanning operation, are a wireless communication device 20 that operates using TFC 3, and a wireless communication device 20' that operates using TFC 7.

In this case, the TFC code setting portion 102 has set TFC 1 in the first preamble detection portion 104 and in the wireless communication portion 114, and the wireless communication device 10 and the wireless communication device 20 are exchanging beacons using TFC 1 (step S302). Then, the TFC code setting portion 102 sets TFC 2 and TFC 3 in the second preamble detection portion 105 and the third preamble detection portion 106, and causes a scan to be performed (step S304). Here, as the wireless communication device 20' is transmitting beacons using TFC 7, the wireless communication device 10 does not receive any beacon from the wireless communication device 20'. On the other hand, the wireless communication device 10 exchanges data and beacons with the wireless communication device 20 using TFC 1 (step S306 and step S308).

Next, the TFC code setting portion 102 sets TFC 4 and TFC 5 in the second preamble detection portion 105 and the third preamble detection portion 106 (step S310). Here, as the wireless communication device 20' is transmitting beacons using TFC 7, the wireless communication device 10 does not receive any beacon from the wireless communication device 20'. On the other hand, the wireless communication device 10 exchanges data and beacons with the wireless communication device 20 using TFC 1 (step S312 and step S314). Below, in the same way, the wireless communication device 10 exchanges data and beacons with the wireless communication device 20 using TFC 1 (step S318, step S322, step S326, step S328, step S332 and step S336).

After that, the TFC code setting portion 102 sets TFC 6 and TFC 7 in the second preamble detection portion 105 and the third preamble detection portion 106 and causes a scan to be performed (step S316). Here, as the wireless communication device 20' is transmitting beacons using TFC 7, the wireless communication device 10 receives a beacon from the wireless communication device 20' and detects the presence of the wireless communication device 20' (step S320). Then, information described in the beacon is stored in the information storage portion 110.

Further, the TFC code setting portion 102 sets TFC 8 and TFC 9 in the second preamble detection portion 105 and the third preamble detection portion 106, and causes a scan to be performed (step S324). However, as the peripheral wireless communication device 20' is transmitting beacons using TFC 7, the wireless communication device 10 does not receive a beacon from the wireless communication device 20'.

Next, the TFC code setting portion 102 sets TFC 10 in the second preamble detection portion 105. Also, the TFC code setting portion 102 once more sets TFC 7, for which a beacon has been received, in the remaining third preamble detection portion 106 (step S330). Here, as the wireless communication device 20' is transmitting beacons using TFC 7, the wireless communication device 10 receives a beacon from the wireless communication device 20' (step S334).

After that, based on the results of the scanning performed at steps S304 to step S330, the TFC code setting portion 102 sets the TFC code to which the setting has been changed in one of the preamble detection portions 104 to 106 (step S338).

In this way, in the fourth example, the wireless communication device 10 is able to continue normal operation while performing a scanning operation. Therefore, when the wireless communication device 10 changes the TFC code, it is not necessary to stop normal operations, thus allowing smoother operation of the network. Note that in the example shown in FIG. 14, the TFC code setting portion 102 once more sets a TFC at step S330 that has received a beacon, but as shown in FIG. 12, the TFC code setting portion 102 may set a TFC that has not received a beacon. Also, the TFC code setting portion 102 may continuously set a TFC code that has received a beacon.

3-2. Operations of Wireless Communication Device According to Present Embodiment Above, the configuration of the wireless communication device 10 according to the present embodiment is explained with reference to FIG. 8 to FIG. 14. Next, the operations of the wireless communication device 10 according to the present embodiment will be explained with reference to FIG. 15 to FIG. 18.

Figure 15:
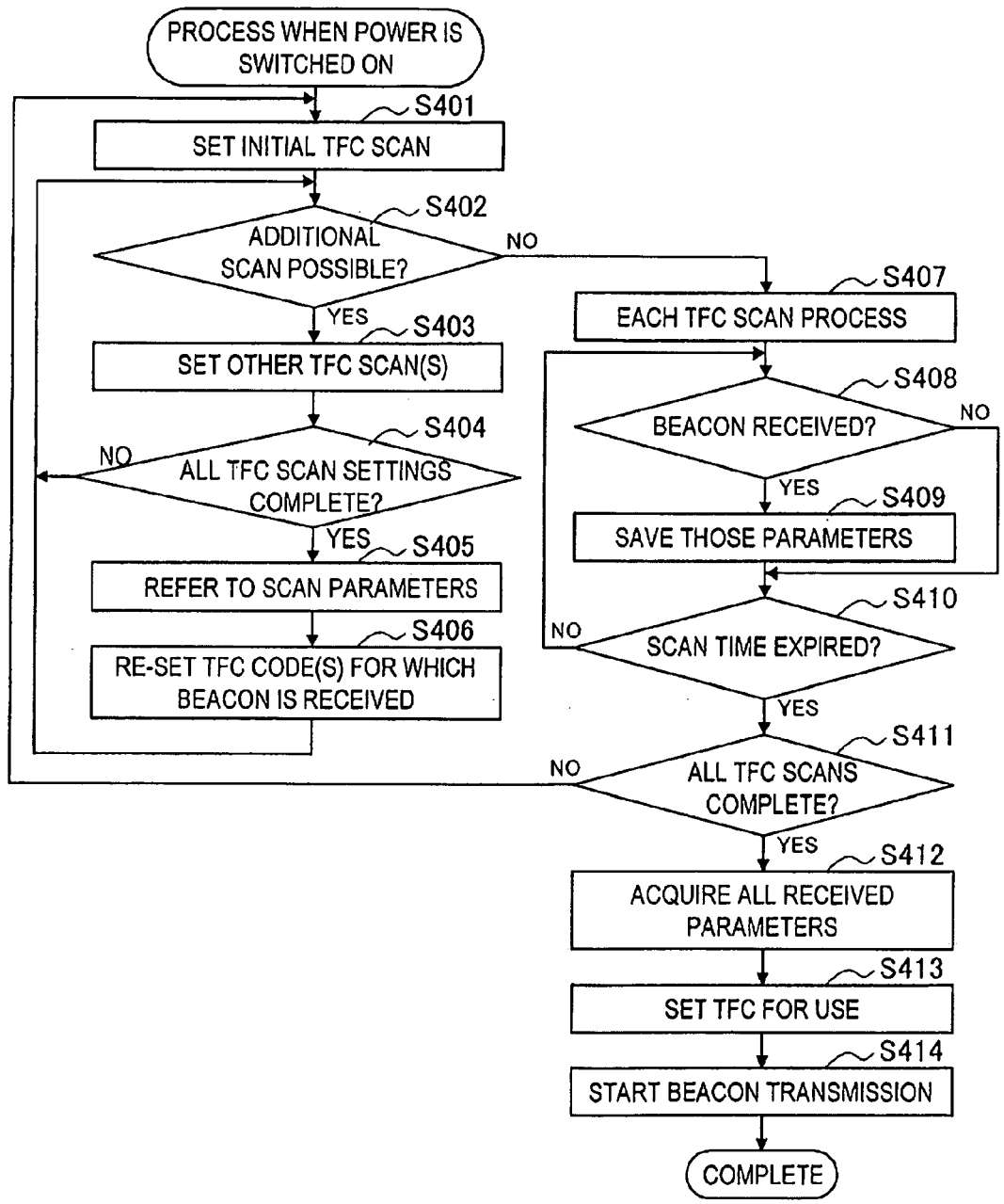

FIG. 15 is a flow chart showing a flow of operations of the wireless communication device 10 when the power source is switched on. As shown in FIG. 15, first, the TFC code setting portion 102 of the wireless communication device 10 sets a TFC code in the first preamble detection portion 104 in order to perform scanning (step S401). Further, if there are other preamble detection portions and if scanning can be performed using the other preamble detection portions (step S402) the TFC code setting portion 102 sets TFC codes in the other preamble detection portions (step S403).

Then, when a series of all the TFC scan settings is complete (step S404), the TFC code setting portion 102 refers to the scanning results stored in the information storage portion 111 (step S405) and once more sets the TFC code that received a beacon (step S406). Note that, as explained in section "3-1. Configuration of wireless communication device according to present embodiment," the TFC code setting portion 102 may once more set a TFC code that has not received a beacon, or may continuously set a TFC code that has received a beacon.

Next, when the TFC codes have been set in each of the preamble detection portions 104 to 106 (step S402), a scanning process is performed by each of the preamble detection portions 104 to 106 (step S407). Then, if a beacon is received (step S408), the parameters of that beacon are stored in the information storage portion 110 (step S409), and that TFC code scan is performed until the scan time period has expired (step S410). Further, if the scanning process for all the TFC codes is not complete, the process returns to step S401, and scanning is once more performed using another TFC code.

Then, when all the TFC scans are complete, the TFC code setting portion 102 acquires all the received parameters from the information storage portion 110 (step S412), and determines the TFC code to be used for normal operation on the device itself (step S413). After that, the wireless communication device 10 starts transmitting beacons using the TFC code determined by the TFC code setting portion 102 (step S414) and starts normal operation to form part of the network.

Figure 16:
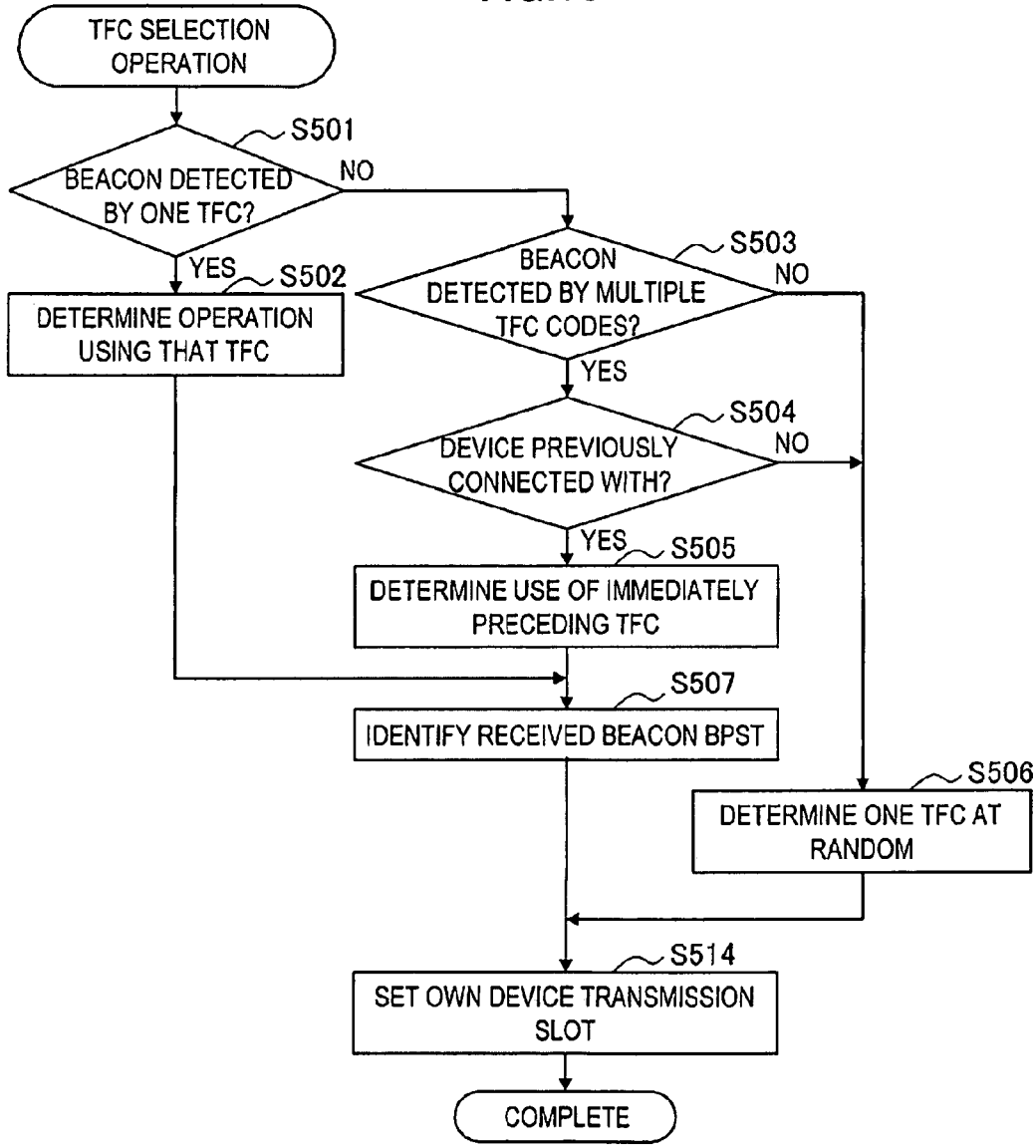
FIG. 16 is a flow chart showing the flow of operations to determine the TFC code for normal operation by the TFC setting portion.

FIG. 16 is a flow chart showing the flow of operations to determine the TFC code for normal operation by the TFC code setting portion 102. As shown in FIG. 16, if the TFC code setting portion 102 has only detected a beacon on one TFC code in the scanning process (step S501), that TFC code is determined as the TFC code for normal operation (step S502).

On the other hand, when beacons have been detected on a plurality of TFC codes (step S503), if there is a beacon that has been received from a previously connected wireless communication device (step S504), the TFC code setting portion 102 determines the TFC code being used by the other wireless communication device as the TFC code for normal operation (step S505). Then, the wireless communication device 10, from the received beacon position, identifies the super frame cycle start position (BPST) (step S507).

Also, if there is no other wireless communication device in the vicinity, and no beacons at all have been detected, the TFC code setting portion 102 selects one TFC code at random (step S506). For example, the TFC code setting portion 102 determines the TFC code with the lowest number, namely TFC 1, as the TFC code for normal operation, and the wireless communication device 10 also performs super frame cycle settings.

Further, after the processing at step S506 or at step S507, the wireless communication device 10 sets its own transmission beacon slot (step S514), and transfers to normal network operation.

Figure 17:
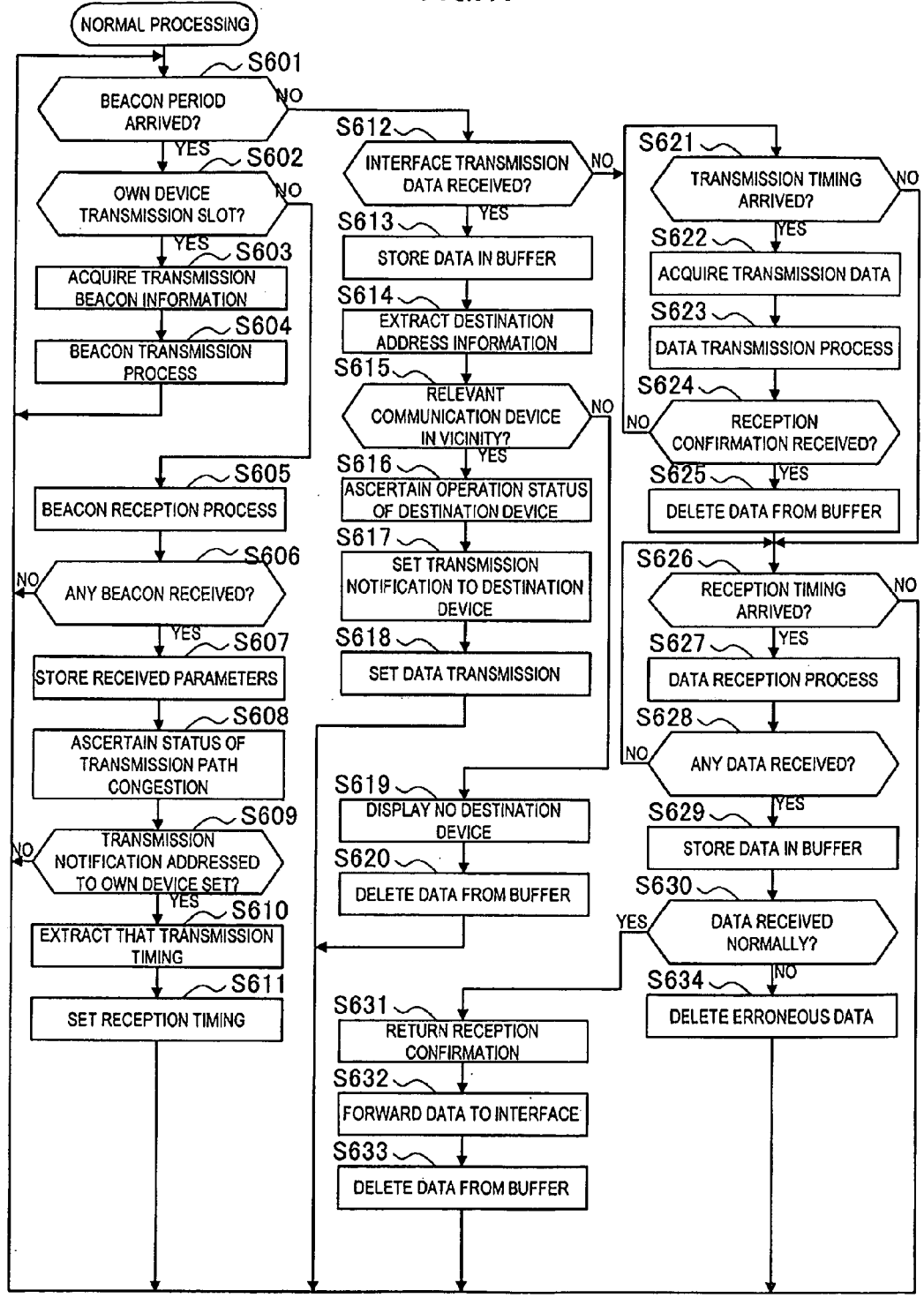
FIG. 17 is a flow chart showing the flow of normal operations of the wireless communication device.

FIG. 17 is a flow chart showing the flow of normal operations of the wireless communication device 10. First, if, during the super frame cycle, the beacon period has arrived (step S601), and further, there is an own device transmission beacon slot (step S602), the wireless communication device 10 acquires information elements to attach to a beacon (step S603), and transmits the beacon (step S604).

Meanwhile, during the beacon period, on slots other than the own device transmission beacon slot, the wireless communication device 10 performs a reception process to receive beacons transmitted from peripheral wireless communication devices (step S605). Then, when the wireless communication device 10 receives a beacon (step S606), it stores received parameters, such as address information for the beacon transmission source device, in the information storage portion 110 (step S607). For example, the wireless communication device 10 comprehensively determines a need to implement PCA communication or the volume of slot reservations etc. and ascertains the status of transmission path congestion (step S608).

Then, if there is a communication notification, such as a request for PCA communication or a DRP reservation notification etc. addressed to the wireless communication device 10 (step S609), the wireless communication device 10 extracts a time band in which a wireless signal addressed to its own device is transmitted (step S610). Then, the wireless communication device 10 sets the extracted time band as the reception timing (step S611). Note that, after the completion of these beacon processes, the wireless communication device 10 returns to the process at step S601.

Meanwhile, if the wireless communication device 10 has received transmission data from a connected device via the interface 116 (step S612), it stores the transmitted data in the transmission data storage portion 117 (step S613). Then, the wireless communication device 10 extracts destination address information from the transmission data (step S614), and if, as determined from the beacon reception status, the destination device that corresponds to the destination address information is in the vicinity (step S615), the wireless communication device 10 ascertains the operation status of the destination device (step S616). Further, as well as transmitting a PCA communication request or DRP reservation notification etc. to the destination device (step S617), the wireless communication device 10 sets the transmission data transmission timing by specifying a time band within the super frame cycle (step S618).

Note that, when there is no destination device in the vicinity, the wireless communication device 10 notifies the application of the connected device that there is no destination device (step S619), and deletes the transmission data from the transmission data storage portion 117 (step S620).

After that, if the transmission timing set by the wireless communication device 10 at a selected super frame position has arrived (step S621), the wireless communication device 10 acquires the transmission data from the transmission data storage portion 117 (step S622). Then, if a prescribed access control procedure is necessary, the wireless communication device 10 transmits the transmission data acquired from the transmission data storage portion 117 after the time for the access control has elapsed (step S623).

Further, if the wireless communication device 10 receives a reception confirmation sent back from the corresponding device (step S624), the wireless communication device 10 deletes the transmission data for which transmission is complete from the transmission data storage portion 117 (step S625). On the other hand, if the wireless communication device 10 does not receive a reception confirmation sent back from the corresponding device, the wireless communication device 10 returns to step S621 and one more transmits the transmission data.

Also, if the reception timing set by the wireless communication device 10 at a selected super frame position has arrived (step S626), the wireless communication device 10 performs the data reception process (step S627).

Here, if the wireless communication device 10 has received data addressed to itself (step S628), it stores the received data in the received data storage portion 115 (step S629). From the FCS value at the end of the data, it determines whether or not the data has been normally received (step S630). Then, if the data has been normally received, the wireless communication device 10 transmits a reception confirmation to the transmission source device (step S631), transmits the received data to the connected device via the interface 116 (step S632), and deletes the received data from the received data storage portion 115 (step S633).

Meanwhile, if the data is not received normally, the wireless communication device 10 does not return a reception confirmation and deletes the received data from the received data storage portion 115 (step S634). After the wireless communication device 10 has completed these data transmission and reception processes, it returns to step S601 and repeats the series of processes.

FIG. 18 is a flow chart showing the flow of changing the TFC code by the wireless communication device 10. The scan control portion 101 of the wireless communication device 10 acquires, for example, the congestion status of the network operating using an existing TFC code (step S701). Then, if the scan control portion 101 determines that there are many communication demands from other communication devices and the wireless communication device 10 itself is unable to meet the demand for communication (step S702), it confirms the TFC codes that the device itself is able to use (step S703). In addition, if it is possible to change the TFC code (step S704), the scan control portion 101 moves to the TFC change process.

Next, the TFC code setting portion 102 continues to use the existing TFC code on one of the preamble detection portions 104 to 106 in order to maintain normal operation (step S705), and if scanning is possible on other TFC codes (step S706), the TFC code setting portion 102 sets other TFC codes in others of the preamble detection portions 104 to 106 (step S707).

Then, if a series of all TFC code scan settings is complete (step S708), the TFC code setting portion 102 refers to the scan results stored in the information storage portion 110 (step S709) and once more sets a TFC code that has received a beacon (step S710). Note that, as explained in section "3-2. Operations of wireless communication device according to present embodiment," the TFC code setting portion 102 may once more set a TFC code that has not received a beacon or may continuously set a TFC code that has received a beacon. Meanwhile, if the series of all the TFC code scan settings is not complete, the wireless communication device 10 returns to step S706 and performs scanning using the remaining TFC codes.

Note that the number of TFC scans is set by deleting the TFC code presently being used (one code) from the number of TFC codes for which preambles can be simultaneously detected by the preamble detection portions 104 to 106 provided in the wireless communication device 10.

Then, after setting the scan for the existing TFC code and the other TFC codes, each of the preamble detection portions 104 to 106 performs a scanning process over a prescribed scan time period (step S711). If a beacon is received (step S712), the information storage portion 110 stores the received parameters (step S713). Note that the scanning process is repeated until the prescribed scan time period expires (step S714).

Also, after the first scan time period has expired, if all the TFC code scans are not complete (step S715), the wireless communication device 10, in order to perform scan settings for the remaining TFC codes, the wireless communication device 10 moves to step s706. On the other hand, if all the TFC code scans are complete (step S715), the wireless communication device 10 acquires the received parameters from the information storage portion 110 (step S716). The wireless communication device 10 then determines which TFC codes can be changed and determines the TFC codes to which settings will be changed (step S717). Meanwhile, if there are not many demands for communication from other communication devices, and the wireless communication device 10 itself is able to meet the communication demand, or if it is not possible to change to another TFC code, the TFC change process is not performed.

4. CONCLUSION

As explained above, the wireless communication device 10 according to the present embodiment includes a plurality of preamble detection portions, namely the first preamble detection portion 104, the second preamble detection portion 105 and the third preamble detection portion 106. Therefore, as the wireless communication device 10 can simultaneously receive wireless signals transmitted using different TFC codes, it can simultaneously ascertain the presence of wireless communication devices operating using different TFC codes.

Further, as the wireless communication device 10 according to the present embodiment is provided with a plurality of preamble detection portions, it is capable of simultaneously scanning a plurality of TFC codes. Therefore, when a scanning operation is necessary, such as after the power source is switched on etc., the wireless communication device 10 according to the present embodiment can complete the scanning operation and form part of a wireless network in a shorter period of time. For example, as the wireless communication device 10 can simultaneously scan three TFC codes, the number of times the TFC codes are switched in order to scan ten TFC codes can be reduced to around three or four times.

Further, with the wireless communication device 10 according to the present embodiment, even during normal operation using a particular TFC code, wireless signals transmitted using another TFC code can be received and the existence and status of peripheral wireless communication devices operating using other TFC codes can be ascertained. Therefore, when changing the TFC code, the wireless communication device 10 can perform scanning in advance using other TFC codes. For example, as the wireless communication device 10 can simultaneously scan three TFC codes, the number of times the TFC codes are switched in order to scan ten TFC codes can be reduced to around four or five times.

Also, as the number of preamble detection portions is greater than the number of baseband demodulators, it is possible to increase the number of TFC codes that can be simultaneously scanned. For example, if there is a communication device that operates using a plurality of TFC codes, there is a high likelihood that the respective beacon periods are dispersed, and so if there is one reception processing portion, it is possible to decode beacon signals transmitted using different TFC codes.

Further, as it is possible to achieve a block structure that is minimal as possible, it is not necessary to structure the existing communication device by simply doubling or tripling the blocks.

Also, by providing at least two baseband demodulators, as with the wireless communication device 10 according to the present embodiment, it is possible to perform a scanning operation using other TFC codes while operating using an existing TFC code. Further, by providing at least two baseband demodulators, as with the wireless communication device 10 according to the present embodiment, it is possible to receive signals from networks with different TFC codes, and it is thus possible to relay (bridge) two networks.

It is not necessary to process each of the steps in the processing performed by the wireless communication device 10 of the present specification chronologically and in accordance with the order noted on the flow charts. For example, each of the steps in the processing performed by the wireless communication device 10 may include processing that is performed in parallel or separately (for example, parallel processing or object processing).

Note that, a computer program can also be created that causes hardware such as a CPU, a ROM, and a RAM that are built-in to the wireless communication device 10 to perform functions that are the same as each structural element of the above-described wireless communication device 10. A storage medium that stores the computer program is also provided. If each function block shown by the functional block diagram in FIG. 8 is structured by hardware, a series of processes can be realized by hardware.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Patent Priority Application JP 2008-099252 filed in the Japan Patent Office on Apr. 7, 2008, the entire content of which is hereby incorporated by reference.

What is claimed is:

1. A wireless communication device comprising:
   a plurality of portions, each receiving portion receiving wireless signals based on a time frequency code set in the each receiving portion, the time frequency code being selected from among a plurality of time frequency codes; and
   a setting portion for setting the time frequency code in the each receiving portion, wherein the setting portion continuously sets the same time frequency code in the each receiving portion that has received a wireless signal, and sets a time frequency code that differs from the time frequency code previously set in the each receiving portion that has not received a wireless signal.

2. The wireless communication device according to claim 1, wherein
   the setting portion changes the time frequency code in the each receiving portion that has received a wireless signal, when a number of the receiving portions that have received a wireless signal exceeds a predetermined number.

3. The wireless communication device according to claim 1, wherein
   the setting portion, after sequentially setting the plurality of time frequency codes in the plurality of receiving portions, resets the time frequency code on one of the plurality of receiving portions to a first time frequency code at which the one of the plurality of receiving portions had received a wireless signal, when the plurality of time frequency codes were sequentially set.

4. The wireless communication device according to claim 1, wherein
   the setting portion, after sequentially setting the plurality of time frequency codes in the plurality of receiving portions, sequentially resets time frequency codes on the plurality of receiving portions to a set of time frequency codes at which wireless signals were not received by the plurality of receiving portions, when the plurality of time frequency codes were sequentially set.

5. The wireless communication device according to claim 1, further comprising:
   a transmission portion that transmits a wireless signal using a first time frequency code selected from among the plurality of time frequency codes, wherein the setting portion sets the first time frequency code on one of the receiving portions from among the plurality of receiving portions, and sequentially sets time frequency codes differing from the first time frequency code on the other receiving portions.

6. A wireless communication method, comprising:
   setting a time frequency code selected from among a plurality of time frequency codes in each of a plurality of receiving portions; and
   changing the time frequency code of the plurality of receiving portions based on a receiving result of a wireless signal in each of the plurality of receiving portions by:
      continuously setting the same time frequency code in the each receiving portion that has received a wireless signal; and
      setting a time frequency code that differs from the time frequency code previously set in the each receiving portion that has not received a wireless signal.

7. The wireless communication method according to claim 6, further including changing the time frequency code on the each receiving portion that has received a wireless signal, when a number of the receiving portions that have received a wireless signal exceeds a predetermined number.

8. The wireless communication method according to claim 6, further including:
   sequentially setting the plurality of time frequency codes in the plurality of receiving portions; and
   resetting the time frequency code on one of the plurality of receiving portions to a first time frequency code at which a first receiving portion received a wireless signal, when the plurality of time frequency codes were sequentially set.

9. The wireless communication method according to claim 6, further including:
   sequentially setting the plurality of time frequency codes in the plurality of receiving portions; and
   resetting time frequency codes on the plurality of receiving portions by assigning time frequency codes at which the plurality of receiving portions did not receive wireless signals, when the plurality of time frequency codes were sequentially set.

10. The wireless communication method according to claim 6, further including:
    transmitting a wireless signal using a first time frequency code;
    setting the first time frequency code on one of the receiving portions from among the plurality of receiving portions; and
    sequentially setting time frequency codes differing from the first time frequency code on the other receiving portions.

11. A non-transitory computer-readable storage medium including computer executable program instructions that, when accessed by a computer, causes the computer to perform a method, comprising:
    setting a time frequency code selected from among a plurality of time frequency codes in each of a plurality of receiving portions; and changing the time frequency code of the plurality of receiving portions based on a receiving result of a wireless signal in each of the plurality of receiving portions by:
continuously setting the same time frequency code in the each receiving portion that has received a wireless signal; and
setting a time frequency code that differs from the time frequency code previously set in the each receiving portion that has not received a wireless signal.

12. A wireless communication system comprising:
a plurality of wireless communication devices, each of the wireless communication devices including
a plurality of receiving portions, each receiving portion receiving wireless signals based on a time frequency code set in the each receiving portion, the time frequency code being selected from among a plurality of time frequency codes; and
a setting portion for setting the time frequency code in the each receiving portion, wherein the setting portion continuously sets the same time frequency code in the each receiving portion that has received a wireless signal, and sets a time frequency code that differs from the time frequency code previously set in the each receiving portion that has not received a wireless signal.

13. The wireless communication system according to claim 12, wherein the setting portion changes the time frequency code in the each receiving portion that has received a wireless signal, when a number of the receiving portions that have received a wireless signal exceeds a predetermined number.

14. The wireless communication system according to claim 12, wherein the setting portion, after sequentially setting the plurality of time frequency codes in the plurality of receiving portions, resets the time frequency code on one of the plurality of receiving portions to a first time frequency code at which the one of the plurality of receiving portions had received a wireless signal, when the plurality of time frequency codes were sequentially set.

15. The wireless communication system according to claim 12, wherein the setting portion, after sequentially setting the plurality of time frequency codes in the plurality of receiving portions, sequentially resets time frequency codes on the plurality of receiving portions to a set of time frequency codes at which wireless signals were not received by the plurality of receiving portions, when the plurality of time frequency codes were sequentially set.

16. The wireless communication system according to claim 12, further including:
a transmission portion that transmits a wireless signal using a first time frequency code selected from among the plurality of time frequency codes, wherein the setting portion sets the first time frequency code on one of the receiving portions from among the plurality of receiving portions, and sequentially sets time frequency codes differing from the first time frequency code on the other receiving portions.

* * * * *